United States Patent
Pawlowski et al.

(10) Patent No.: US 12,204,901 B2
(45) Date of Patent: Jan. 21, 2025

(54) CACHE SUPPORT FOR INDIRECT LOADS AND INDIRECT STORES IN GRAPH APPLICATIONS

(71) Applicant: Intel Corporation, Santa Clara, CA (US)

(72) Inventors: Robert Pawlowski, Beaverton, OR (US); Sriram Aananthakrishnan, Portland, OR (US); Jason Howard, Portland, OR (US); Joshua Fryman, Corvallis, OR (US)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 17/359,305

(22) Filed: Jun. 25, 2021

(65) Prior Publication Data

US 2022/0413855 A1 Dec. 29, 2022

(51) Int. Cl.
*G06F 9/30* (2018.01)
*G06F 9/38* (2018.01)
*G06F 12/0875* (2016.01)

(52) U.S. Cl.
CPC ...... *G06F 9/30047* (2013.01); *G06F 9/30036* (2013.01); *G06F 9/30038* (2023.08); *G06F 9/30043* (2013.01); *G06F 9/3861* (2013.01); *G06F 9/3867* (2013.01); *G06F 12/0875* (2013.01); *G06F 2212/1021* (2013.01)

(58) Field of Classification Search
None
See application file for complete search history.

(56) References Cited

U.S. PATENT DOCUMENTS

| | | |
|---|---|---|
| 10,929,132 B1 | 2/2021 | Pawlowski et al. |
| 2018/0081691 A1* | 3/2018 | Kulkarni .............. G06F 9/3838 |
| 2019/0235872 A1* | 8/2019 | Gellerich ................ G06F 9/383 |
| 2020/0104164 A1* | 4/2020 | Pawlowski ........... G06F 9/3877 |

OTHER PUBLICATIONS

Sriram Aananthakrishnan et al., "PIUMA: Programmable Integrated Unified Memory Architecture," Oct. 13, 2020, 6 pages, arXiv:2010.06277v1 [cs.AR], Cornell University.

* cited by examiner

*Primary Examiner* — Michael Sun
(74) *Attorney, Agent, or Firm* — NICHOLSON DE VOS WEBSTER & ELLIOTT LLP

(57) ABSTRACT

Techniques for operating on an indirect memory access instruction, where the instruction accesses a memory location via at least one indirect address. A pipeline processes the instruction and a memory operation engine generates a first access to the at least one indirect address and a second access to a target address determined by the at least one indirect address. A cache memory used with the pipeline and the memory operation engine caches pointers. In response to a cache hit when executing the indirect memory access instruction, operations dereference a pointer to obtain the at least one indirect address, not set a cache bit, and return data for the instruction without storing the data in the cache memory; and in response to a cache miss, operations set the cache bit, obtain, and store a cache line for a missed pointer, and return data without storing the data in the cache memory.

20 Claims, 22 Drawing Sheets

| Instruction | Form Arguments | Description |
|---|---|---|
| load.ind | r1, r2, r3, r4, SIZE, AM, OS, OT, LEV-IND | If LEV-IND = 0, r1 = mem[(mem[r2]*SIZE) + r3];<br>If LEV-IND = 1, r1 = mem[(mem[(mem[r2]*OS)+r3]*SIZE)+r4;<br>If all-address format, r3 and r4 are read but unused;<br>If LEV-IND = 0, r4 is read but unused. |
| store.ind | r1, r2, r3, r4, SIZE, AM, OS, OT, LEV-IND | If LEV-IND = 0, mem[(mem[r2]*SIZE) + r3] = r1;<br>If LEV-IND = 1, mem[(mem[(mem[r2]*OS)+r3]*SIZE)+r4 = r1;<br>If all-address format, r3 and r4 are read but unused;<br>If LEV-IND = 0, r4 is read but unused. |
| storeack.ind | r1, r2, r3, r4, SIZE, AM, OS, OT, LEV-IND | If LEV-IND = 0, mem[(mem[r2]*SIZE) + r3] = r1;<br>If LEV-IND = 1, mem[(mem[(mem[r2]*OS)+r3]*SIZE)+r4 = r1;<br>If all-address format, r3 and r4 are read but unused;<br>If LEV-IND = 0, r4 is read but unused. |

FIG. 1

CACHE SUPPORT FOR INDIRECT LOADS AND INDIRECT STORES IN GRAPH APPLICATIONS

This invention was made with Government support under Agreement No. HR0011-17-3-0004, awarded by the Defense Advanced Research Projects Agency (DARPA). The Government has certain rights in the invention.

TECHNICAL FIELD OF THE DISCLOSURE

Embodiments of the disclosure relate to the field of computer processor architecture; and more specifically, to cache support for indirect loads and indirect stores in graph applications.

BACKGROUND

Graph workloads very commonly access vertex data in an indirect manner. For example, take the spare matrix-dense vector multiplication (SpMV) kernel, which performs the equation: y=Ax, where A is a sparse matrix and x is a dense vector. Large sparse matrices are typically compressed into a format like compressed sparse row (CSR), which is a vectorized list of non-zero entries in the sparse matrix. A sparse matrix represented in a CSR format will have three 1-D areas: one array holds all of the non-zero values in the matrix; one array holds the index pointer into the first non-zero element of each row; and the final array holds the column index corresponding to each non-zero element in A.

As an example, for each non-zero element in each row of a matrix, the column index is first read out, which index is an unsigned pointer (offset by the row base) into the vector which is multiplied to the sparse matrix value. When utilizing computer processing to perform these operations, the operations lend themselves to indirect memory operations, such as indirect loads and indirect stores. However, conventional processor architecture suffer from inefficient resource usage and bad scaling on graph workload. One architecture to provide Instruction Set Architecture (ISA) support to execute indirect loads and indirect stores in a single instruction for enabling efficient and scalable graph analysis is the Programmable Integrated Unified Memory Architecture (PIUMA). A reference titled PIUMA: Programmable Integrated Unified memory Architecture by Sriram Aananthakrishnan et al., arXiv:2010.06277v1 [cs.AR] 13 Oct. 2020, Cornell University, provides a background on PIUMA.

Where indirect operations do improve the execution time to perform data manipulations for non-cached CSR lists, the authors of this disclosure have found that when the CSR list is cached and sequentially accessed, the system may experience performance degradation. In some instances, the performance by direct load and direct store instructions may outperform indirect loads and indirect stores, when the CSR list is cached employing known caching techniques. A challenge is to address improving performance of instructions using indirection when employing cache memory.

BRIEF DESCRIPTION OF DRAWINGS

Various embodiments in accordance with the present disclosure will be described with reference to the drawings, in which:

FIG. 1 is a table illustrating three example indirect instructions under the PIUMA ISA, according to some embodiments;

DETAILED DESCRIPTION

Figure 2:
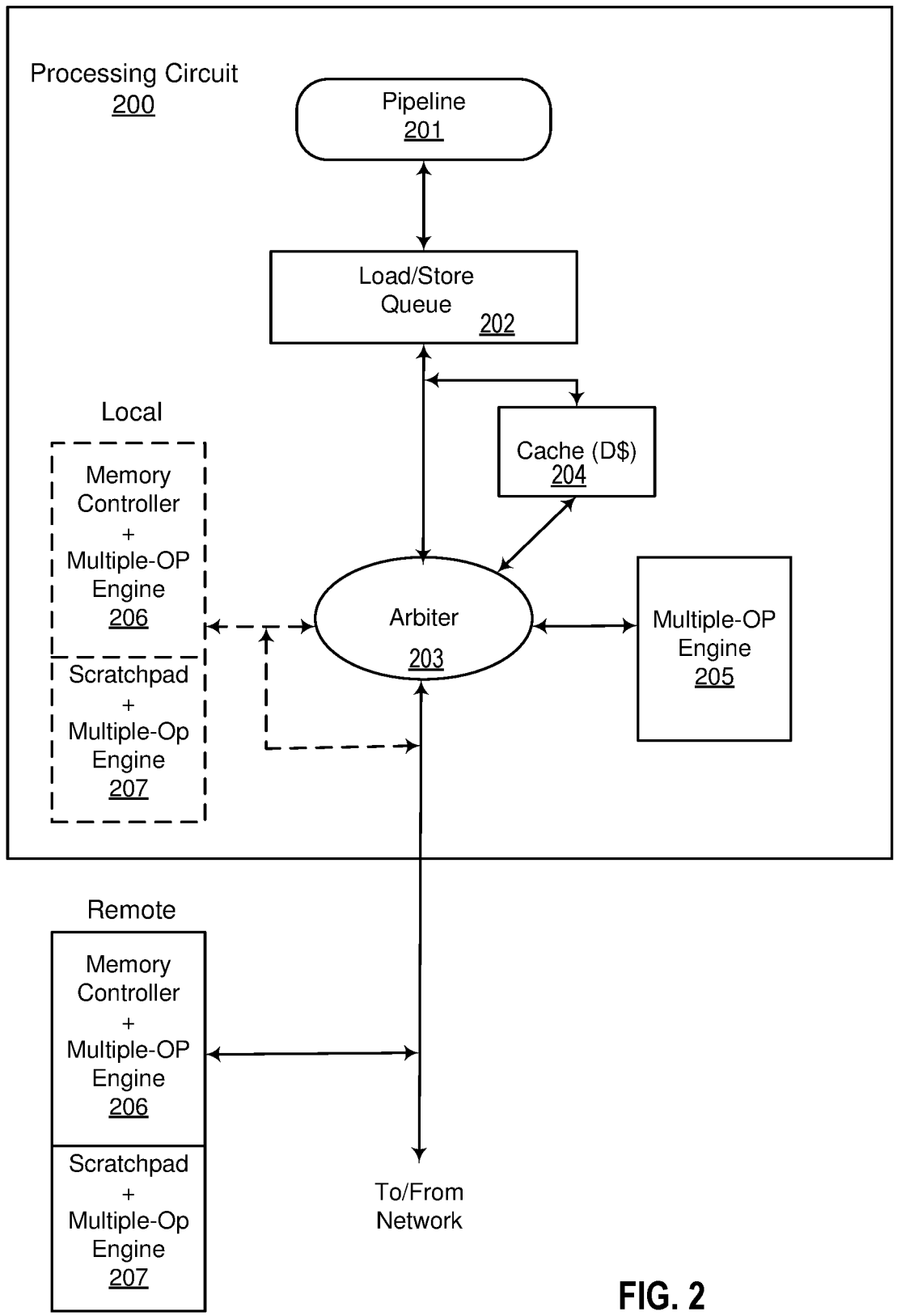
FIG. 2 is a block circuit diagram showing a use of a cache memory with the indirect memory access instruction, according to some embodiments.

In the following description, numerous specific details are set forth. However, it is understood that some embodiments may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

The present disclosure relates to methods, apparatus, systems, and non-transitory computer-readable storage media for performing indirect loads and indirect stores for accessing compressed lists in graph applications and caching of a pointer list in a cache memory. According to some embodiments, the cache memory is a data cache memory (designated DS), which stores a pointer list for use with instructions using the Programmable Integrated Unified Memory Architecture (PIUMA) indirect Instruction Set Architecture (ISA).

Indirect addressing modes are different from direct addressing modes when executing a single instruction. A primary difference between direct and indirect addressing is that in direct addressing the address field refers directly to a memory location at which the data is transferred, such as load or store. For indirect addressing, the address field refers to an indirect location, such as a register or offset, that contains a redirection pointer (pointer read or dereference), which then redirects to a memory location for the remote access and the transfer of data (e.g., load/store). Some instructions provide for multiple redirection, such as indirect-indirect-load or indirect-indirect-store instructions that provides for two indirections to the memory location.

FIG. 1 is a table illustrating three example indirect instructions under the PIUMA ISA, according to some embodiments. The three instructions illustrated in table 100 are: indirect load (load.ind); indirect store (store.ind); and indirect store acknowledge (storeack.ind). The disclosure is not limited to just these three instructions. The descriptions under the Forms Arguments are:

For load.ind:
r1=For load.ind: Return register for loaded data. For store.ind: Source data to store.
r2=Address of source pointer.
r3=Base value to add to dereferenced integer offset (value at r2).
OS=Chooses (integer) offset size for 'base+offset' mode'. Operable according to 64 bits or 32 bits. Ignore if AM=A
SIZE=Size of data value to read/write. 2-bit option selects between 8, 16, 32, or 64 bits.
r4=If operation is a double-indirection, base value to add to second dereferenced integer offset value.

For store.ind:
r1=For load.ind: Return register for loaded data. For store.ind: Source data to store.
r2=Address of source pointer.
r3=Base value to add to dereferenced integer offset (value at r2).
OS=Chooses (integer) offset size for 'base+offset' mode. Operable according to 64 bits or 32 bits. Ignore if AM=A
SIZE=Size of data value to read/write. 2-bit option selects between 8, 16, 32, or 64 bits.
r4=If operation is a double-indirection, base value to add to second dereferenced integer offset value.

For storeack.ind:
r1=For load.ind: Return register for loaded data. For store.ind: Source data to store.
r2=Address of source pointer.
r3=Base value to add to dereferenced integer offset (value at r2).
OS=Chooses (integer) offset size for 'base+offset' mode. Operable according to 64 bits or 32 bits. Ignore if AM=A
SIZE=Size of data value to read/write. 2-bit option selects between 8, 16, 32, or 64 bits.
r4=If operation is a double-indirection, base value to add to second dereferenced integer offset value.

In the Description column, LEV-IND=1 indicates a next indirection-level pointer and LEV-IND=0 indicates a final remote data location for the indirect instruction.

Although various systems can operate on these indirect instructions, some embodiments can utilize the pipeline and op-engines described in U.S. Pat. No. 10,929,132, which further describes the above-noted three indirect instructions.

Implementing these indirect operations as a single instruction which performs the CSR list read, pointer dereference, remote data access, and data/acknowledgment return to the pipeline can result in performance optimizations, such as:

Reduced total latency for an indirect access due to fewer network hops when compared to the pipeline executing the pointer load, dereference, and store as separate instructions; and Reduction in the total number of instructions executed for a given routine that may walk through a pointer list.

Comparisons of the load.ind, store.ind, and storeack.ind instructions against PIUMA implementations not utilizing these instructions for non-cached CSR lists show a consistent performance benefit to using the *.ind instructions. However, further workload analysis has shown that the *.ind instructions are out performed by a non-*.ind implementation where the CSR list is cached and accessed sequentially. While the total number of instructions using the indirect ISA is much lower than the "regular" implementation (i.e., loading each address individually), the total number of cycles for the ops is significantly higher. The comparison is not favorable to the non-cached load.ind operations due to the following details:

The cacheline spatial locality when accessing the CSR list leads to high hit rates and a reduction in average per-element latency of accessing the CSR list directly in memory;

Sending all requests to the memory, such as Dynamic Random-Access-Memory (DRAM) saturates a Memory Controller (MC) quickly and therefore increases latency per access. This causes the (non-indirect) loads of the variable to also see increased latency as the queueing delay significantly rises with the bottleneck at the MC; and The PIUMA pipelines are barrel multi-threaded, meaning that a single thread within the multi-threaded pipeline will issue a memory request (load, store, storeack, and all indirect variants) and wait until the response returns before executing its next instruction.

Because of this, each individual thread will see the full latency of the *.ind operation (i.e. pointer read+remote data access).

This analysis led to the conclusion that the indirect ISA operations are not practical for use in PIUMA when sequentially walking a list if they cannot support caching of the CSR list while simultaneously returning the single-use random data non-cached. Accordingly, this disclosure covers the situation of providing support in accessing the list through a pipeline cache, while simultaneously accessing the random remote data non-cached. Providing this capability incurs no algorithmic overhead beyond the indirect ISA, and also result in improved performance when compared to the non-indirect ISA implementations.

Providing cache support for the indirect operations (indirect ops) can result in improved performance for graph applications that walk through compressed lists. The ISA results in fewer instructions per loop iteration. Additionally, the indirect support via the near-memory engines is maintained, ensuring a lower number of network hops per operation.

FIG. 2 is a block circuit diagram showing a use of a cache memory with the indirect memory access instruction, according to some embodiments. A processing circuit 200 can be a processor, a processing core of a processor, an execution engine, a processing system, or any other circuit capable of providing processing capability to operate on an indirect memory access instruction, such as the PIUMA ISA. The processing circuit 200 includes a pipeline 201 to operate on the instruction, a load/store queue (LSQ) 202, an arbiter or arbitration circuit (ARB) 203, a cache memory or cache engine, which includes a data cache memory (DS) 204, and a multiple memory operation engine 205. A network connection connects to other circuitry and/or devices, such as a memory (e.g., DRAM) as the final target of the indirect memory access instructions, where the access is obtained by a memory controller (MC).

A memory controller+Multiple-Op Engine (MC/MOE) 206 provides an access to the target on the network. In some embodiment, the MC/MOE 206 is placed proximate to an endpoint location (near or at the network interface) to operate as a near memory engine. FIG. 2 illustrates this remote placement of MC/MOE 206 as a solid-lined box. In some embodiment, there may be a remote placement of a scratchpad memory (SPAD)+multi-op engine (SPAD/MOE) 207 with the MC/MOE 206. In some embodiments the MC/MOE 206, as well as the SPAD/MOE 207, if implemented, at a local placement of the processing circuit 200. FIG. 2 illustrates this local placement of MC/MOE 206 and SPAD/MOE 207 as a dashed-lined box. When placed locally, the connection to the network from MC/MOE 206 and/or SPAD/MOE 207 may or may not go through the ARB 203.

Figure 3:
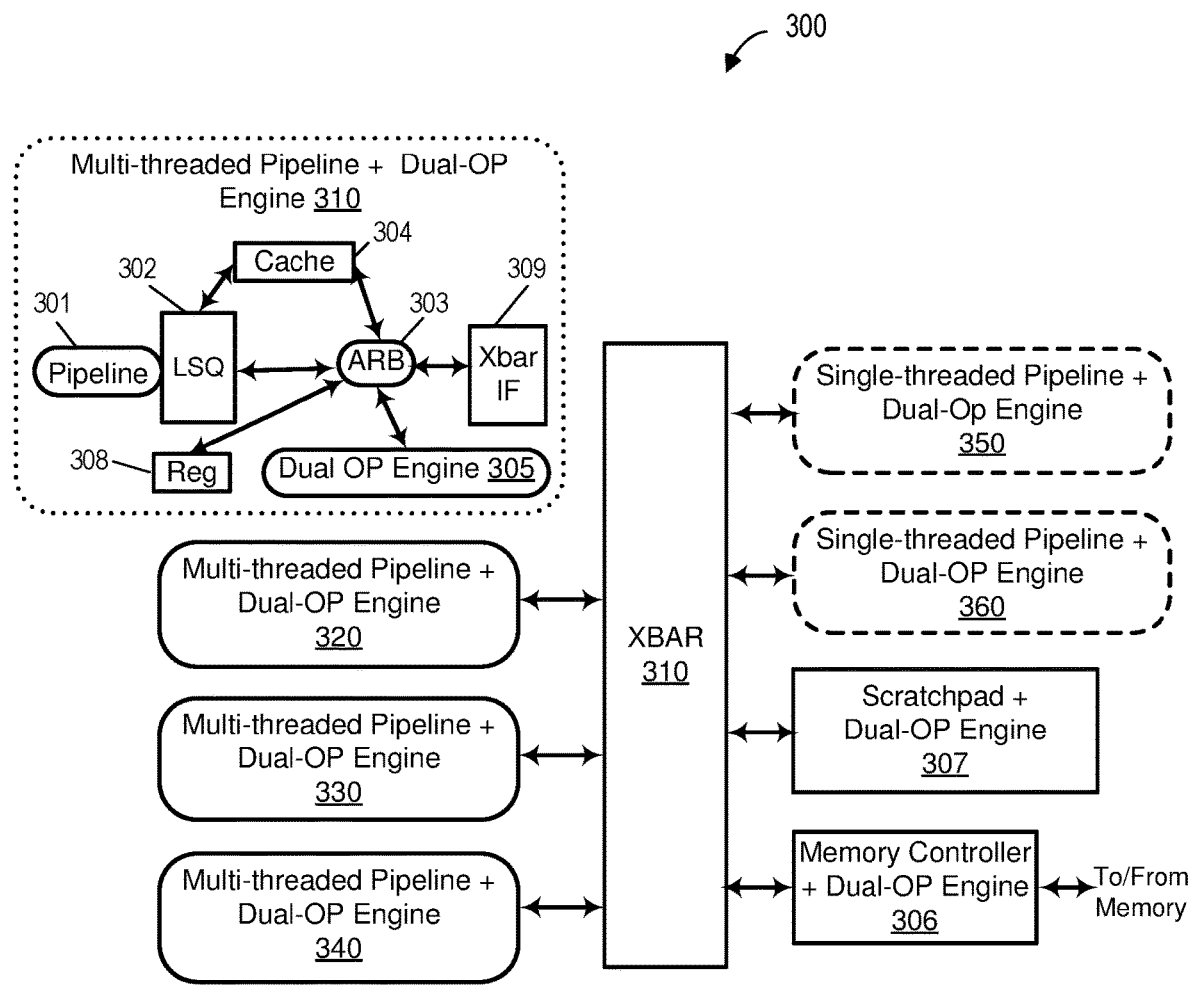
FIG. 3 is a block circuit diagram showing another example of a processing circuit for providing processing capability to operate on the indirect memory access instructions, according to some embodiments.

FIG. 3 is a block circuit diagram showing another example of a processing circuit 300 for providing processing capability to operate on the indirect memory access instructions. In FIG. 3, a Multi-Threaded Pipeline (MTP) 301 is shown in place of pipeline 201. LSQ 302, ARB 303, and cache memory (DS) 304 correspond to respective components 202, 203 and 204. The multi-op engine 205 is shown as a dual memory operation (dual-op) engine 305. Some embodiments can include a set of registers 308 (e.g., register file) and an interface 309.

The processing circuit 300 includes a plurality of MTP+dual-op engine circuitry 310, shown as circuitry 310, 320, 330 and 340. Some embodiments may have more than or less than the four shown. The configuration of 310 is duplicated in the other MTP+dual-op engine circuitry 320, 330 and 340. A crossbar (XBAR) interface 309 communicatively connects/couples each MTP+dual-op engine configuration to a XBAR 310. In some embodiments, processing circuit 300 can include one or more Single-Threaded Pipeline+dual-op engine. The processing circuit 300 shows two such circuit configurations 350 and 360. In some embodiments, the MTP 301 can concurrently handle 16 threads, which, together with the single-threaded pipelines, can concurrently handle 66 threads for the processing circuit 300.

FIG. 3 shows the MC/MOE 206 and SPAD/MOE 207 of FIG. 2 as a MC+dual-op engine (MC/DOE) 306 and SPAD+dual-op engine (SPAD/DOE) 307. The location of MC/DOE 306 and SPAD/DOE 307 correspond to the remote location noted for MC/MOE 206 and SPAD/MOE 207 in FIG. 2.

The pipeline 201/301, in some embodiments, can also fetch an instruction, decode, and execute the instruction. The multiple-op engine 205 and the dual-op engine 305 include capabilities to perform multiple memory operations (two for the dual-op engine 305) from a single indirect memory access instruction. In some embodiments, the engine 205/305 perform block memory transfers using a direct memory access (DMA) technique. The OP engine 205/305 communicates respectively with the OP engine of MC OP engine 206/306 and/or SPAD OP engine 207/307. In some embodiments, instead of separating the functions of the OP engines, the OP engines 205/305 can be incorporated in the MC 206/306 and/or SPAD 207/307, the op engine functions can be combined in one location to provide the multiple/dual operations described herein. In some embodiments, the original requestor only sends the initial request, and the engines 205/305 are responsible for sending the follow-on requests to finish the remaining (e.g., dual) portion of the memory access operation. When executing the indirect memory access instruction, the engine 205/305 provides the initial and indirection portion of the access and the OP engines 206/306 and/or 207/307 provide the access to the target (e.g., memory).

In some embodiments, the multi-threaded processing core described in U.S. patent application Ser. No. 16/147,302 filed Sep. 28, 2018 and titled Memory System Architecture For Multi-Threaded Processors can be adapted for use with the cache memory operation described below.

Caching in PIUMA

Every pipeline, regardless of if it is an STP or MTP, has a local data cache memory (DS) 204/304, which can be utilized at a programmer's discretion. The PIUMA address map reserves an address bit (e.g., bit[62]) as a cache "steering" bit. If this bit of the target address is asserted (e.g., set), all load and store requests from the pipeline 201/301 is made through its cache memory 204/304. If the bit is de-asserted (not set), the request bypasses the cache memory and goes directly to the memory location (shown as a direct line between LSQ 202/302 and ARB 203/303).

In scenarios where there is more than one level of indirection (e.g., IND-IND-LD), the operation may walk through multiple pointer lists. However, due to the randomness of this sequence (and the remote compute involved), in some embodiments only the first pointer list, which has the highest likelihood of sequential access, is cached.

Cache Modifications to Support Indirect ISA

To support the indirect operations, the cache memory 204/304 uses logic to provide the following functionality:

Logic to dereference the pointer value read from the list. The pointers can be either 32 or 64 bit integers and are converted to a byte offset by multiplying by the SIZE field of the received *.ind request (2-bit) and added to a base address (r3 argument of the *.ind ISA). This provides the next address, either the next indirection-level pointer if (LEV-IND=1) or the final remote data location (if LEV-IND=0).

The capability to generate the unique modified request types necessary for communication with the near-memory multiple-op/dual-op engine are the indirect load and indirect store variants (IND-LD and IND-ST) as well as the double indirect variants (IND-IND-LD) and (IND-IND-ST). One modification implemented is the addition of a cache "steering" bit 'C', or simply stated as a cache bit, which indicates that the request is from the pipeline's 201/301 cache memory 204/304. The behavior that the near memory engine will follow based on this 'C' option is further described below in the next section below.

Figure 4:
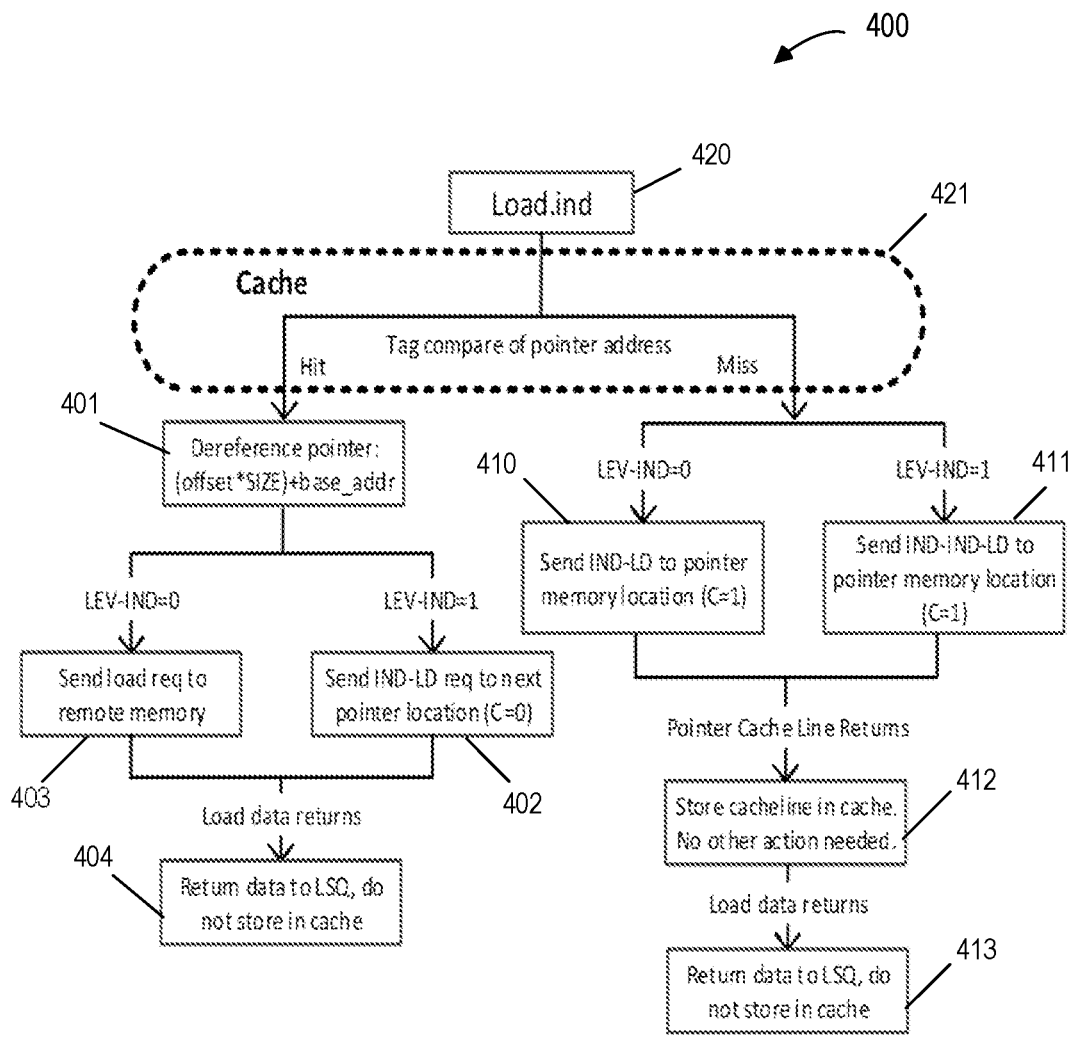
FIG. 4 shows a flow diagram when the cache memory receives an indirect load request from the pipeline, according to some embodiments.

FIG. 4 shows a flow diagram 400 when the cache memory receives an indirect load (load.ind) request (operation 420) from the pipeline LSQ 202/302, according to some embodiments. Note that the store.ind flow is similar except that an acknowledgment, store.ack, returns instead of data. In both cases, if the pointer location hits in the cache memory 421, the cache memory is responsible for dereferencing the pointer and sending the next request in the sequence (operation 401). Cache memory 421 can be the cache memory 204/304 earlier described. The process flow does not set the 'C' bit (C=0) and sends the load request to the next pointer location when LEV-IND=1 (operation 402) and sends the load request to remote memory when LEV-IND=0 (operation 403). The final response that returns from the remote memory request (load data or store acknowledgment) will be returned to the LSQ and not allocated into the cache memory 421 (operation 404).

If the pointer location misses in the cache memory, the cache memory logic immediately sends an IND-LD (or IND-IND-LD) request to the pointer memory with the 'C' bit asserted (C=1) (operation 410 or 411), based on LEV-IND being 0 or 1. The cache memory will then receive two responses. The first response will be the cacheline of the pointer memory (operation 412). This response is stored into the cache memory and not used further (for this operation), because the dual-op-engine will have already used the specific pointer value for this operation. The second response will be the final data value (or acknowledgment), which is returned to the LSQ and not allocated into the cache (operation 413).

Multiple-OP/Dual-OP Engine

This section describes the dual-op engine 305 (or multiple-op engine 205) handling of indirect requests to accommodate the optimizations in the cache. The dual-op engine sits near each memory interface in the PIUMA system and performs local memory read/writes and address calculations. As mentioned in the previous section, the cache memory logic sends a modified request to the dual op engine by including a 'C' bit to indicate that it is a cached request.

Figure 5:
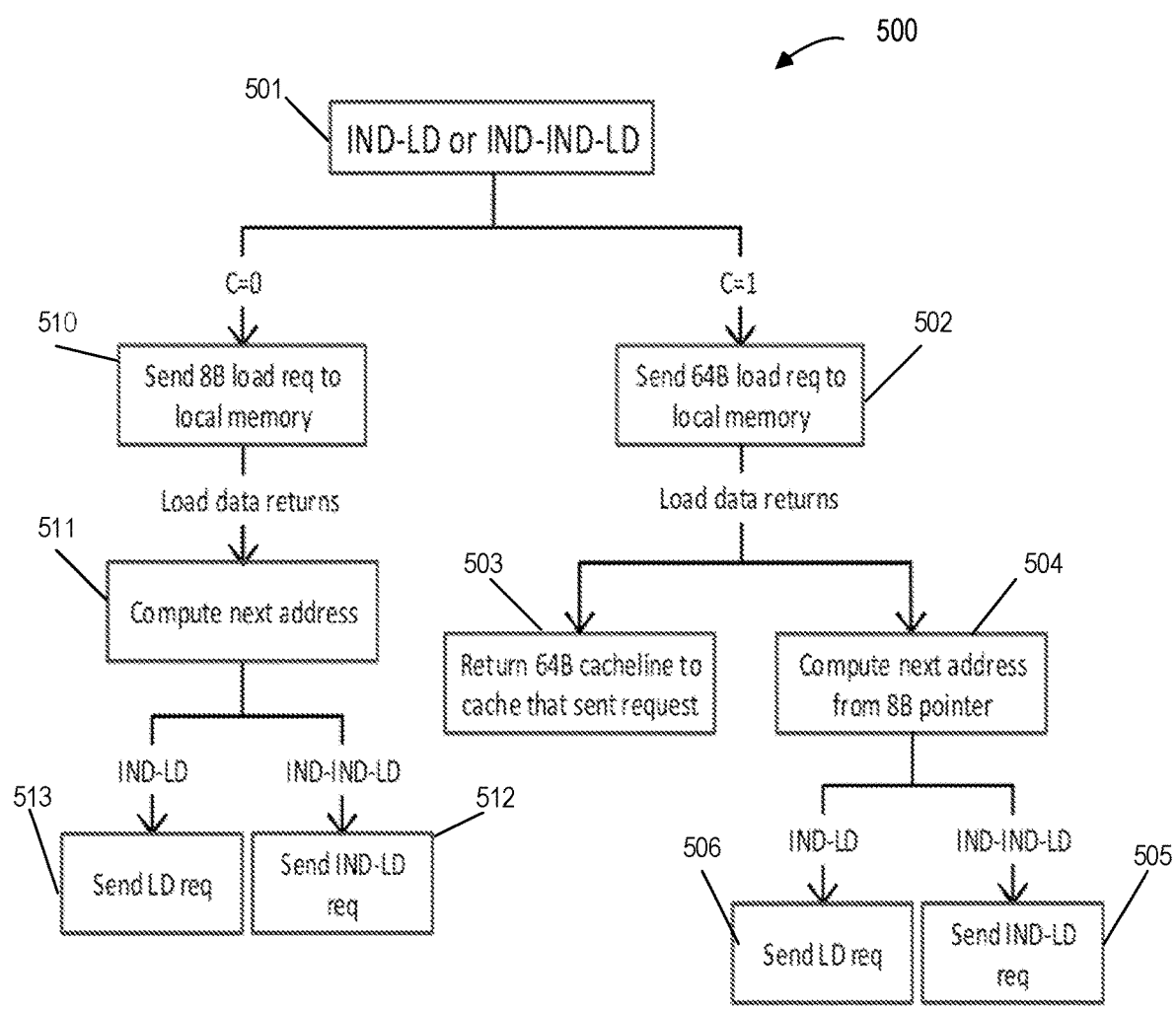
FIG. 5 shows a flow diagram when the op engine receives an IND-LD or IND-IND-LD instruction, according to some embodiments.

FIG. 5 shows a flow diagram 500 when the op engine receives an IND-LD or IND-IND-LD instruction, according to some embodiments. These two scenarios are shown because they are the two possible requests that the engine may receive from the cache memory logic, when the cache memory services a load.ind request (operation 501). If the cache services a store.ind request, the dual-op engine receives either an IND-ST or IND-IND-ST request, which would follow a similar flow.

A key difference when handling a request from the cache (C=1) is that the op engine will request a full cache-line of data from the memory (in PIUMA this is 64 bytes), when the cache bit 'C' is set (operation 502), instead of only the 8 byte pointer of interest when the cache bit is not set (operation 510). The op engine will then return the cacheline to the requesting cache (operation 503), while dereferencing the 8 byte pointer that was targeting by the received request (operation 504). Finally, the op engine makes the follow on IND-LD for the IND-IND-LD instruction (operation 505) or load request to the computed destination address (operation 506) for the IND-LD instruction.

For the case when C=0, the load return of the data computes the next address (operation 511). The op engine makes the follow on IND-LD for the IND-IND-LD instruction (operation 512) or load request to the computed destination address (operation 513) for the IND-LD instruction.

Figure 6:
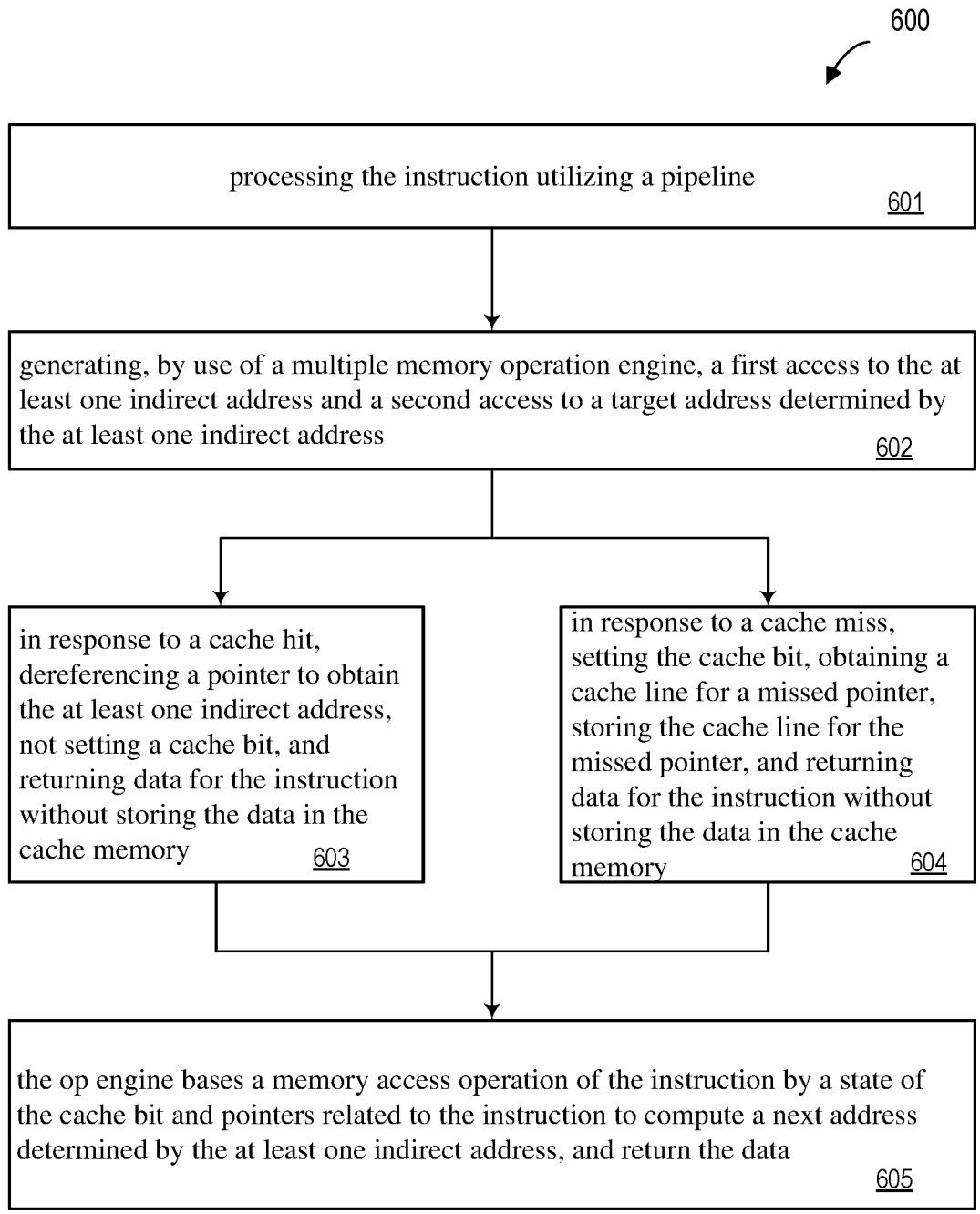
FIG. 6 shows a flow diagram to illustrate a method of processing an indirect memory access instruction, according to some embodiments.

FIG. 6 shows a flow diagram 600 to illustrate a method of processing an indirect memory access instruction, according to some embodiments. The diagram 600 exemplifies a technique described above, in which the instruction accesses a memory location via at least one indirect address. The method provides for the processing of the instruction utilizing a pipeline (operation 601). The pipeline may be a multi-thread pipeline or a single-thread pipeline. In some embodiments, there may be a plurality of pipelines.

The method generates, by use of a multiple memory operation engine, a first access to the at least one indirect address and a second access to a target address determined by the at least one indirect address (operation 602). In some embodiments, the multiple memory operation engine is a dual-operation engine.

In response to a cache hit when executing the indirect memory access instruction, dereferencing a pointer to obtain the at least one indirect address, not setting a cache bit, and returning data for the instruction without storing the data in a cache memory (operation 603). However, in response to a cache miss when executing the indirect memory access instruction, setting the cache bit, obtaining a cache line for a missed pointer for the instruction, storing the cache line for the missed pointer in the cache memory, and returning data for the instruction without storing the data in the cache memory (operation 604).

The result being that the multiple memory operation engine bases a memory access operation of the instruction by a state of the cache bit and pointers related to the instruction to compute a next address determined by the at least one indirect address, and return the data (operation 605).

Thus, by use of the cache memory and the op engine to operate with the cache memory, cache support is available for use with indirect memory access instructions. The cache memory allows cache support to improve performance for graph applications that walk through compressed lists. The ISA results in fewer instructions per loop iteration. By use of the cache bit, the cache can control which returns are to be cached in the cache memory and which are not to be cached, in order not to slow the performance when operating with indirect memory access instructions.

Although the above description referenced the indirect memory access instruction as a PIUMA ISA utilizing a particular processing configuration, such as shown in FIGS. 2 and 3, some embodiments may utilize different computer architecture. Accordingly, below description describes some other configurations for implementation of the technique described above.

Figure 7:
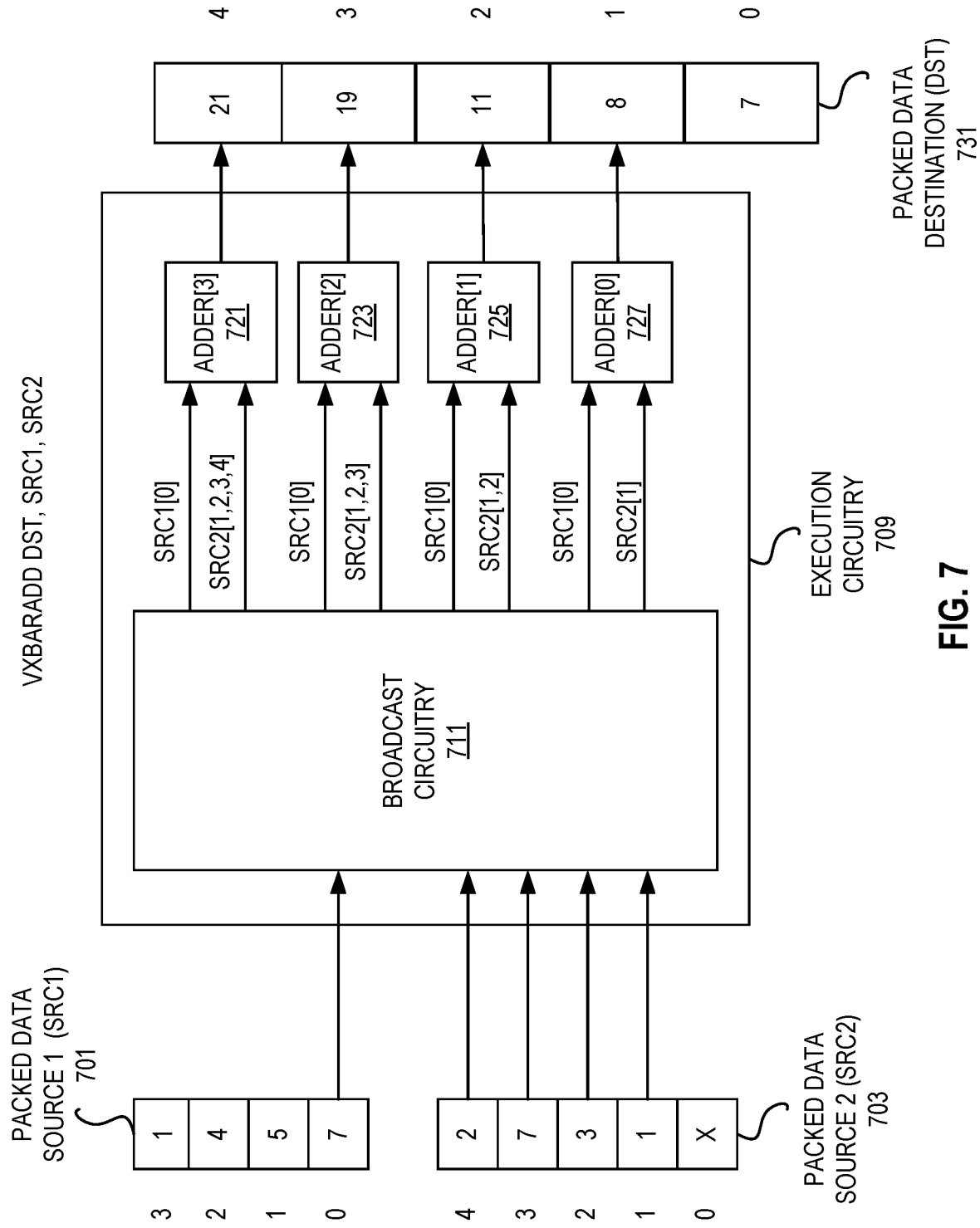
FIG. 7 illustrates an exemplary execution of an arithmetic recurrence instruction.

FIG. 7 illustrates an exemplary execution of an arithmetic recurrence instruction. While this illustration is in little endian format, the principles discussed herein work in big endian format. Further, in this example, each packed data element position of the packed data (e.g., SIMD or vector) destination 731 does not include an original value stored in that position. The arithmetic recurrence instruction includes fields for a destination (packed data destination (DST) 731) and two sources (packed data source 1 (SRC1) 701 and packed data source 2 (SRC2) 703). In this example, the arithmetic operation is addition.

Packed data source 1 701 includes four packed data elements (shown at packed data element positions 0-3). Depending upon the implementation, packed data source 1 701 is a packed data register (e.g., a XMM, YMM, ZMM, vector, SIMD, etc. register), or a memory location.

Packed data source 2 703 includes at least 5 packed data elements (shown at packed data element positions 0-4). Depending upon the implementation, packed data source 2 703 is a packed data register (e.g., a XMM, YMM, ZMM, vector, SIMD, etc. register), or a memory location.

The two packed data sources 701, 703 are fed into execution circuitry 709 to be operated on. In particular, execution circuitry 709 performs an arithmetic recurrence using the source data. In this example, the arithmetic operation is addition (as indicated by the opcode of the instruction). Broadcast circuitry 711 broadcasts a data value from a least significant packed data position of packed data source 1 701 to each adder circuit 721, 723, 725, and 727. The broadcast circuitry 711 also broadcasts each packed data element position of packed data source 2 703, other than a least significant packed data element position, and those packed data element positions of lesser significance to one or more adders 721, 723, 725, and 727. The broadcasting is as follows: for the second most least significant packed data element position (SRC2[1]), the value is broadcast to all adders 721, 723, 725, and 727. For the next most least significant packed data element position (SRC2[2]), the value is broadcast to adders 721, 723, and 725, etc. The adders 721, 723, 725, and 727 generate a sum of each of their inputs. Note, while a plurality of adders is shown, in some embodiments, the same adder is reused.

Packed data destination 731 stores the results from the adders 721, 723, 725, and 727. As shown, the least significant packed data element position of packed data destination 731 is not altered. The packed data element position to be used in packed data destination 731 correlates with the packed data element position of packed data source 2 703 that was the most significant in a particular addition by an adder 721, 723, 725, or 727. In this illustration, packed data destination 731 is the same as packed data source 701, however, that does not need to be the case.

Figure 8:
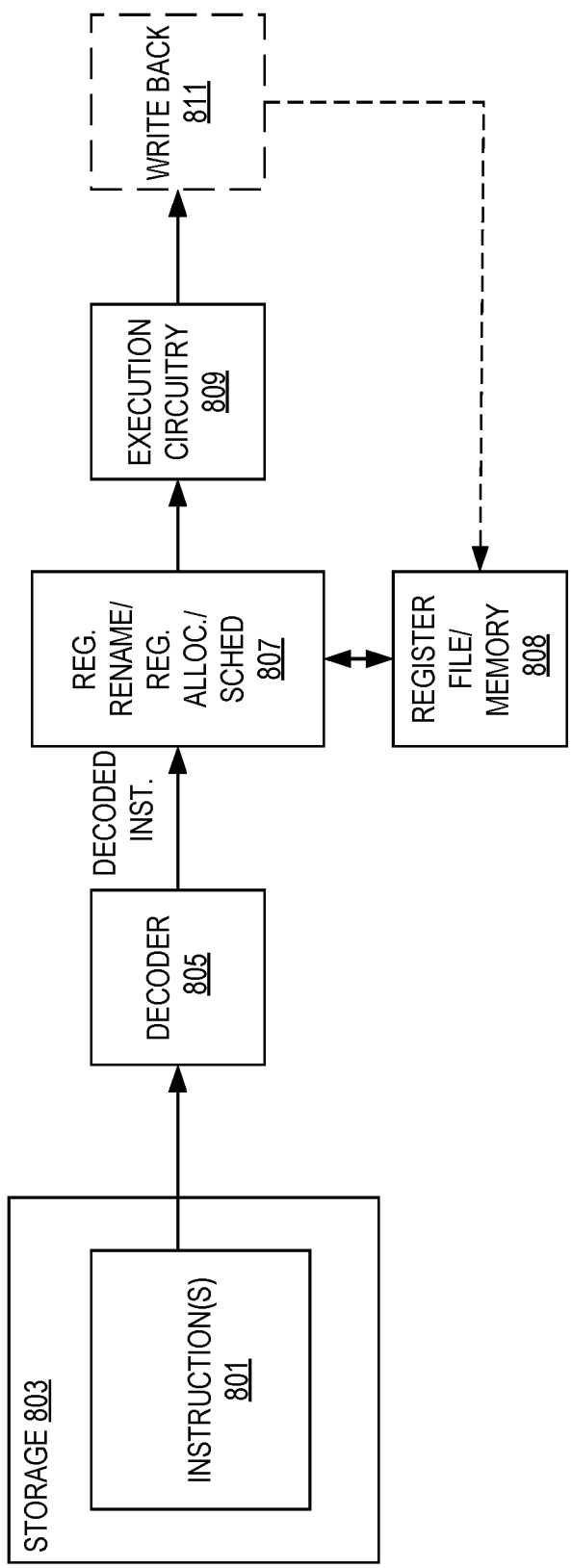
FIG. 8 illustrates embodiments of hardware to process an instruction.

FIG. 8 illustrates embodiments of hardware to process an instruction. As illustrated, storage 803 stores the instruction(s) 801 to be executed.

The instruction 801 is received by decode circuitry 805. For example, the decode circuitry 805 receives this instruction from fetch logic/circuitry. The instruction includes fields for an opcode, first and second sources, and a destination. In some embodiments, the sources and destination are registers, and in other embodiments one or more are memory locations. In some embodiments, the opcode details which arithmetic operation is to be performed.

More detailed embodiments of at least one instruction format will be detailed later. The decode circuitry 805 decodes the instruction into one or more operations. In some embodiments, this decoding includes generating a plurality of micro-operations to be performed by execution circuitry (such as execution circuitry 809). The decode circuitry 805 also decodes instruction prefixes.

In some embodiments, register renaming, register allocation, and/or scheduling circuitry 807 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 808 store data as operands of the instruction to be operated on by execution circuitry 809. Exemplary register types include packed data registers, general purpose registers, and floating-point registers.

Execution circuitry 809 executes the decoded instruction. Exemplary detailed execution circuitry is shown in FIG. 7. The execution of the decoded instruction causes the execution circuitry to perform the operation.

In some embodiments, retirement/write back circuitry 811 architecturally commits the destination register into the registers or memory 808 and retires the instruction.

An embodiment of a format for an arithmetic recurrence instruction is VXBARARITH DSTREG, SRC1, SRC2. In some embodiments, VXBARARITH{B/W/D/Q} is the opcode mnemonic of the instruction. ARITH may be multiply, add, subtract, divide, etc. DSTREG is a field for the packed data destination register operand. SRC1 and SRC2 are fields for the sources such as packed data registers and/or memory.

Figure 9:
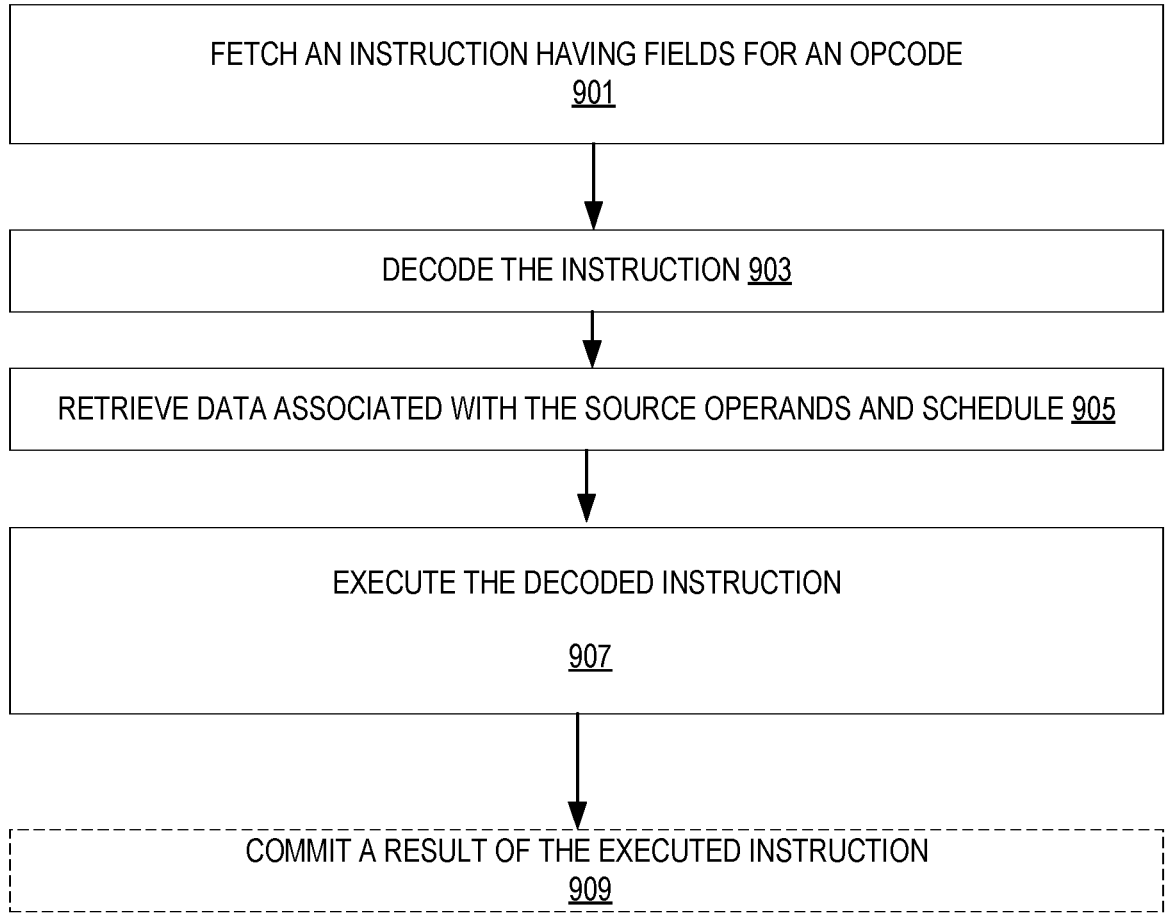
FIG. 9 illustrates an embodiment of method performed by a processor to process the instruction.
Figure 14:
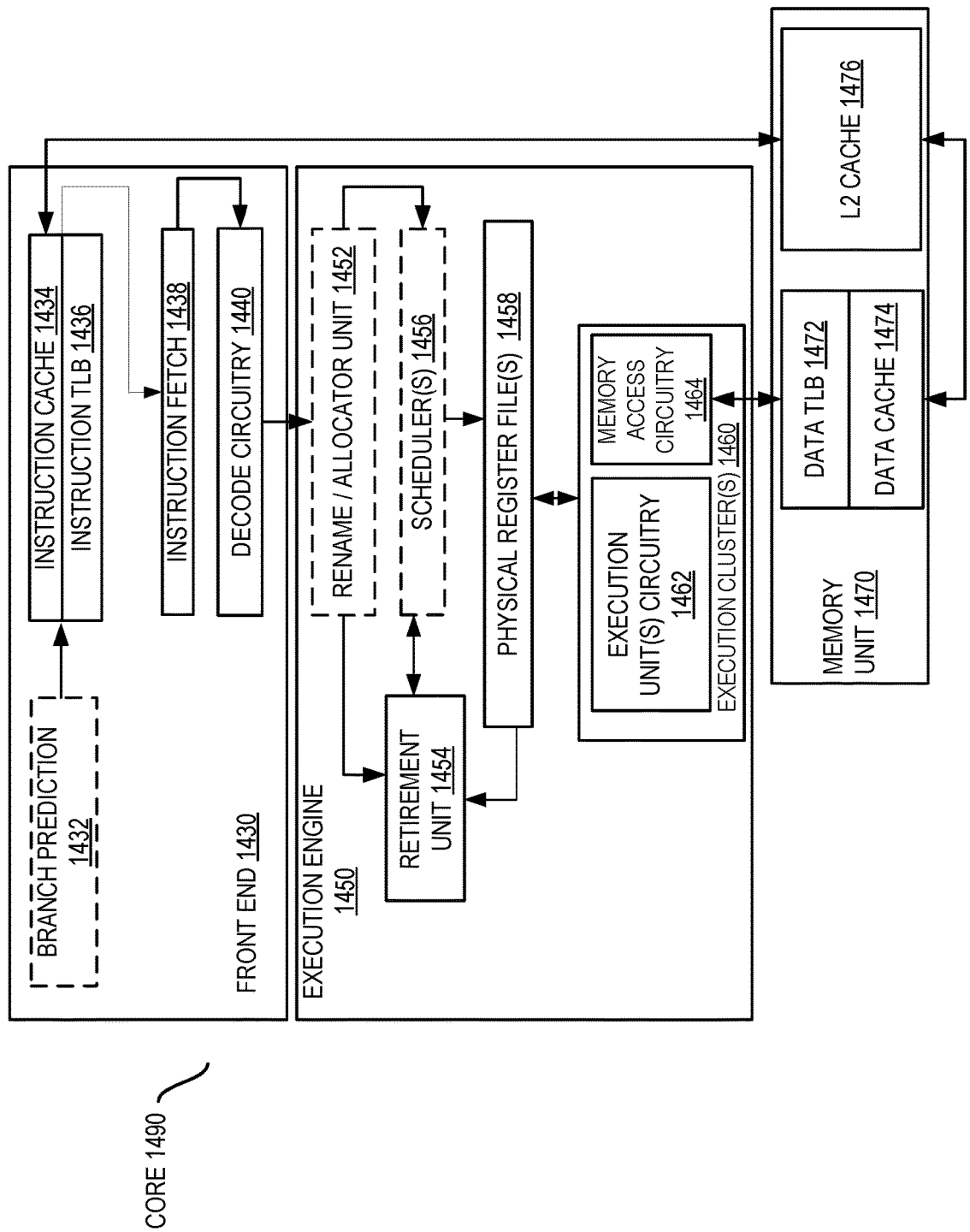
FIG. 14 is a block diagram illustrating both an exemplary embodiment of an in-order architecture core and an exemplary register renaming, out-of-order issue/execution architecture core to be included in a processor according to some embodiments.

FIG. 9 illustrates an embodiment of method performed by a processor to process the instruction. For example, a processor core as shown in FIG. 14, a pipeline as detailed below, etc. performs this method.

At 901, an instruction is fetched. For example, an arithmetic recurrence instruction is fetched. The arithmetic recurrence instruction includes fields for an opcode. In some embodiments, the instruction further includes a field for a writemask. In some embodiments, the instruction is fetched from an instruction cache. The source operands and destination operand are packed data. The opcode of the arithmetic recurrence indicates which arithmetic operation (e.g., multiply, add, subtract, divide, etc.) to perform.

The fetched instruction is decoded at 903. For example, the fetched arithmetic recurrence instruction is decoded by decode circuitry such as that detailed herein.

Data values associated with the source operands of the decoded instruction are retrieved at 905. For example, when one or more of the source operands are memory operands, the data from the indicated memory location is retrieved.

At 907, the decoded instruction is executed by execution circuitry (hardware) such as that detailed herein.

In some embodiments, the instruction is committed or retired at 909.

Figure 10:
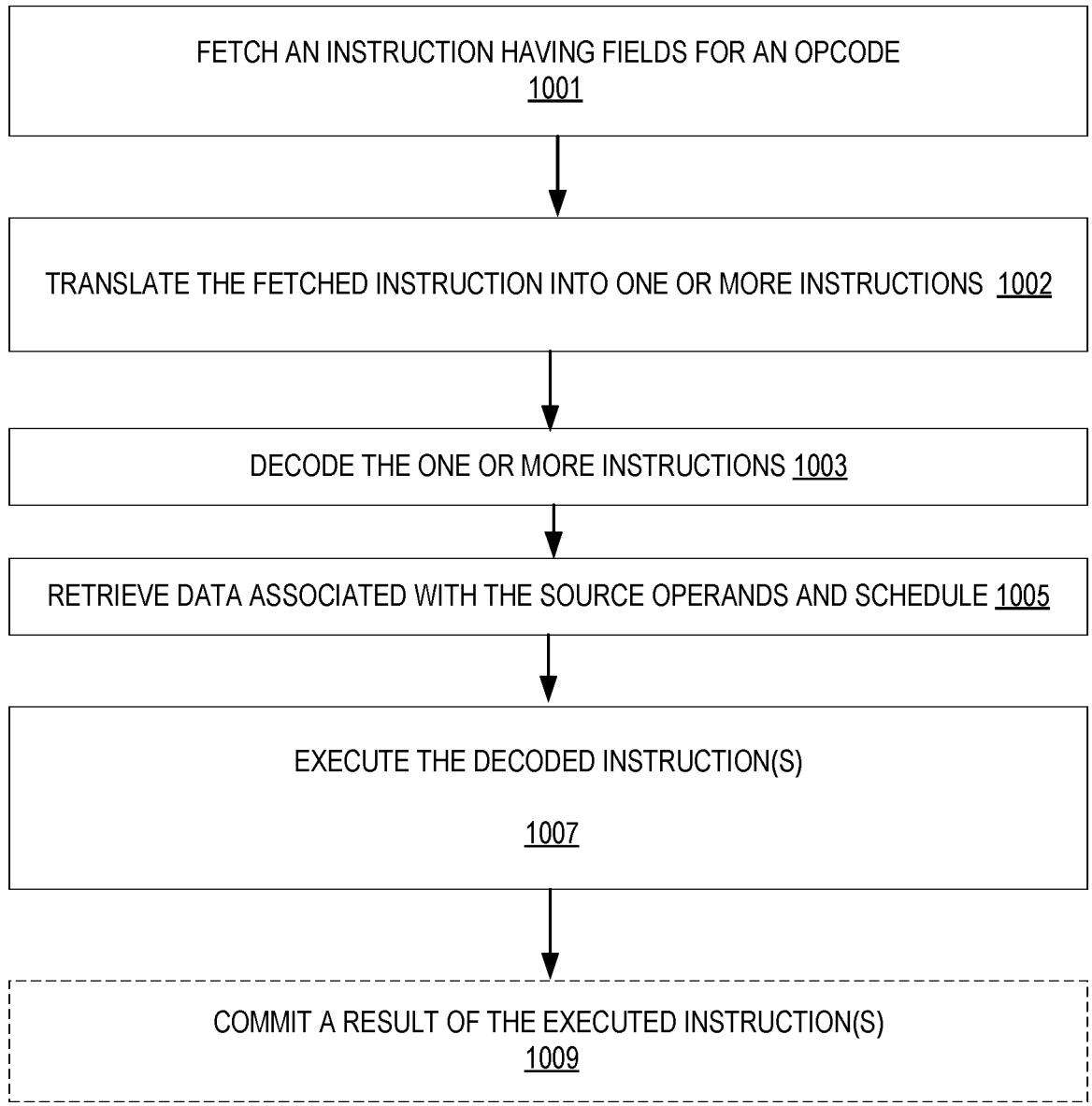
FIG. 10 illustrates an embodiment of method performed by a processor to process an arithmetic recurrence instruction using emulation or binary translation.

FIG. 10 illustrates an embodiment of method performed by a processor to process an arithmetic recurrence instruction using emulation or binary translation. For example, a processor core as shown in FIG. 14, a pipeline as detailed below, etc. performs this method.

At 1001, an instruction is fetched. For example, an arithmetic recurrence instruction is fetched. The arithmetic recurrence instruction includes fields for an opcode. In some embodiments, the instruction further includes a field for a writemask. In some embodiments, the instruction is fetched from an instruction cache. The source operands and destination operand are packed data.

The fetched instruction of the first instruction set is translated into one or more instructions of a second instruction set at 1002.

The one or more translated instructions of the second instruction set are decoded at 1003. In some embodiments, the translation and decoding are merged.

Data values associated with the source operands of the decoded instruction are retrieved at 1005. For example, when one or more of the source operands are memory operands, the data from the indicated memory location is retrieved.

At 1007, the decoded instruction(s) of the second instruction set is/are executed by execution circuitry (hardware) such as that detailed herein.

In some embodiments, the instruction is committed or retired at 1009.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
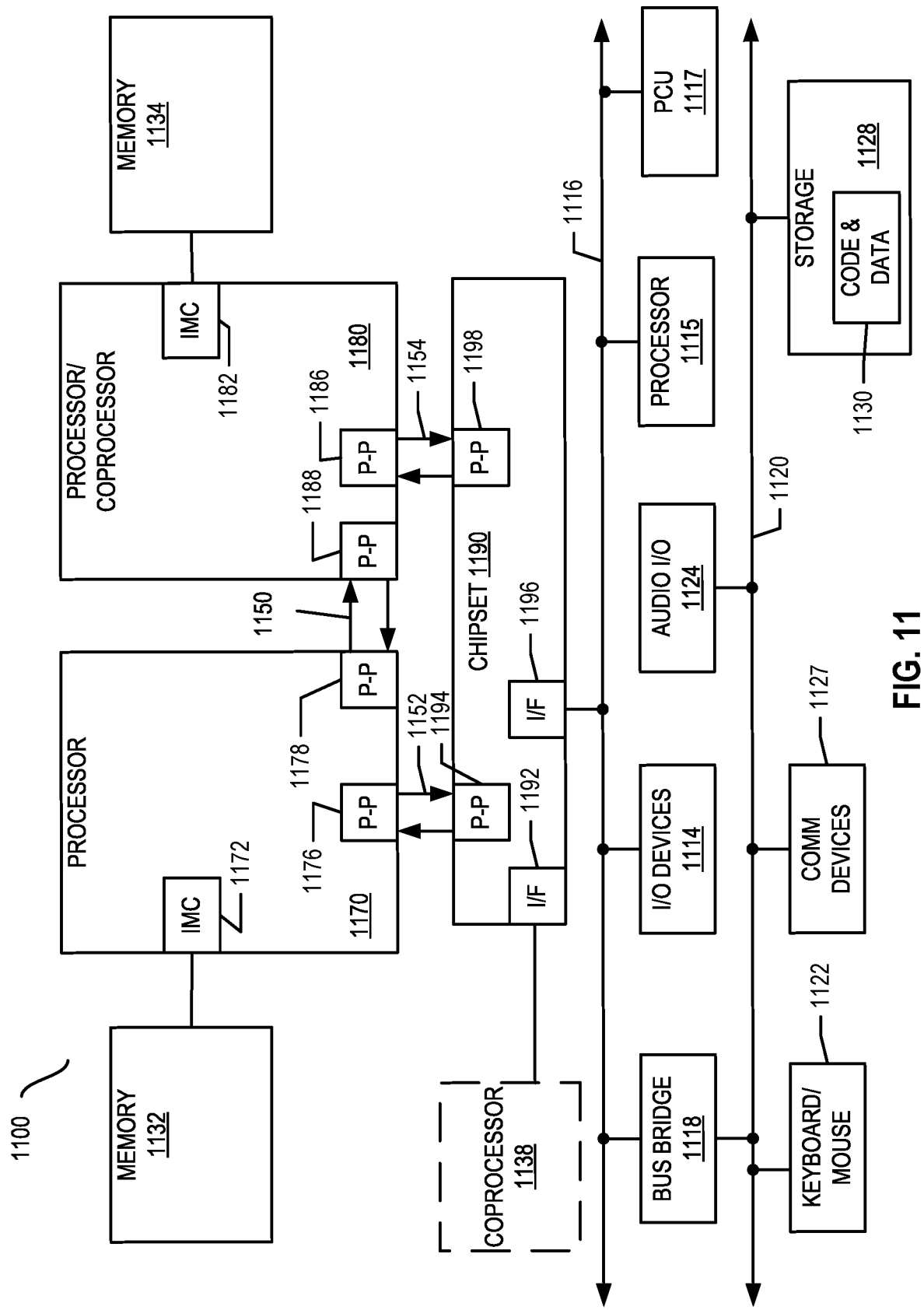
FIG. 11 illustrates embodiments of an exemplary system.

FIG. 11 illustrates embodiments of an exemplary system. Multiprocessor system 1100 is a point-to-point interconnect system and includes a plurality of processors including a first processor 1170 and a second processor 1180 coupled via a point-to-point interconnect 1150. In some embodiments, the first processor 1170 and the second processor 1180 are homogeneous. In some embodiments, first processor 1170 and the second processor 1180 are heterogenous.

Processors 1170 and 1180 are shown including integrated memory controller (IMC) units circuitry 1172 and 1182, respectively. Processor 1170 also includes as part of its interconnect controller units point-to-point (P-P) interfaces 1176 and 1178; similarly, second processor 1180 includes P-P interfaces 1186 and 1188. Processors 1170, 1180 may exchange information via the point-to-point (P-P) interconnect 1150 using P-P interface circuits 1178, 1188. IMCs 1172 and 1182 couple the processors 1170, 1180 to respective memories, namely a memory 1132 and a memory 1134, which may be portions of main memory locally attached to the respective processors.

Processors 1170, 1180 may each exchange information with a chipset 1190 via individual P-P interconnects 1152, 1154 using point to point interface circuits 1176, 1194, 1186, 1198. Chipset 1190 may optionally exchange information with a coprocessor 1138 via a high-performance interface 1192. In some embodiments, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor 1170, 1180 or outside of both processors, yet connected with the processors via P-P interconnect, such that either or both processors' local cache information may be stored in the shared cache if a processor is placed into a low power mode.

Chipset 1190 may be coupled to a first interconnect 1116 via an interface 1196. In some embodiments, first interconnect 1116 may be a Peripheral Component Interconnect (PCI) interconnect, or an interconnect such as a PCI Express interconnect or another I/O interconnect. In some embodiments, one of the interconnects couples to a power control unit (PCU) 1117, which may include circuitry, software, and/or firmware to perform power management operations with regard to the processors 1170, 1180 and/or co-processor 1138. PCU 1117 provides control information to a voltage regulator to cause the voltage regulator to generate the appropriate regulated voltage. PCU 1117 also provides control information to control the operating voltage generated. In various embodiments, PCU 1117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1117 is illustrated as being present as logic separate from the processor 1170 and/or processor 1180. In other cases, PCU 1117 may execute on a given one or more of cores (not shown) of processor 1170 or 1180. In some cases, PCU 1117 may be implemented as a microcontroller (dedicated or general-purpose) or other control logic configured to execute its own dedicated power management code, sometimes referred to as P-code. In yet other embodiments, power management operations to be performed by PCU 1117 may be implemented externally to a processor, such as by way of a separate power management integrated circuit (PMIC) or another component external to the processor. In yet other embodiments, power management operations to be performed by PCU 1117 may be implemented within BIOS or other system software.

Various I/O devices 1114 may be coupled to first interconnect 1116, along with an interconnect (bus) bridge 1118 which couples first interconnect 1116 to a second interconnect 1120. In some embodiments, one or more additional processor(s) 1115, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 1116. In some embodiments, second interconnect 1120 may be a low pin count (LPC) interconnect. Various devices may be coupled to second interconnect 1120 including, for example, a keyboard and/or mouse 1122, communication devices 1127 and a storage unit circuitry 1128. Storage unit circuitry 1128 may be a disk drive or other mass storage device which may include instructions/code and data 1130, in some embodiments. Further, an audio I/O 1124 may be coupled to second interconnect 1120. Note that other architectures than the point-to-point architecture described above are possible. For example, instead of the point-to-point architecture, a system such as multiprocessor system 1100 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 12:
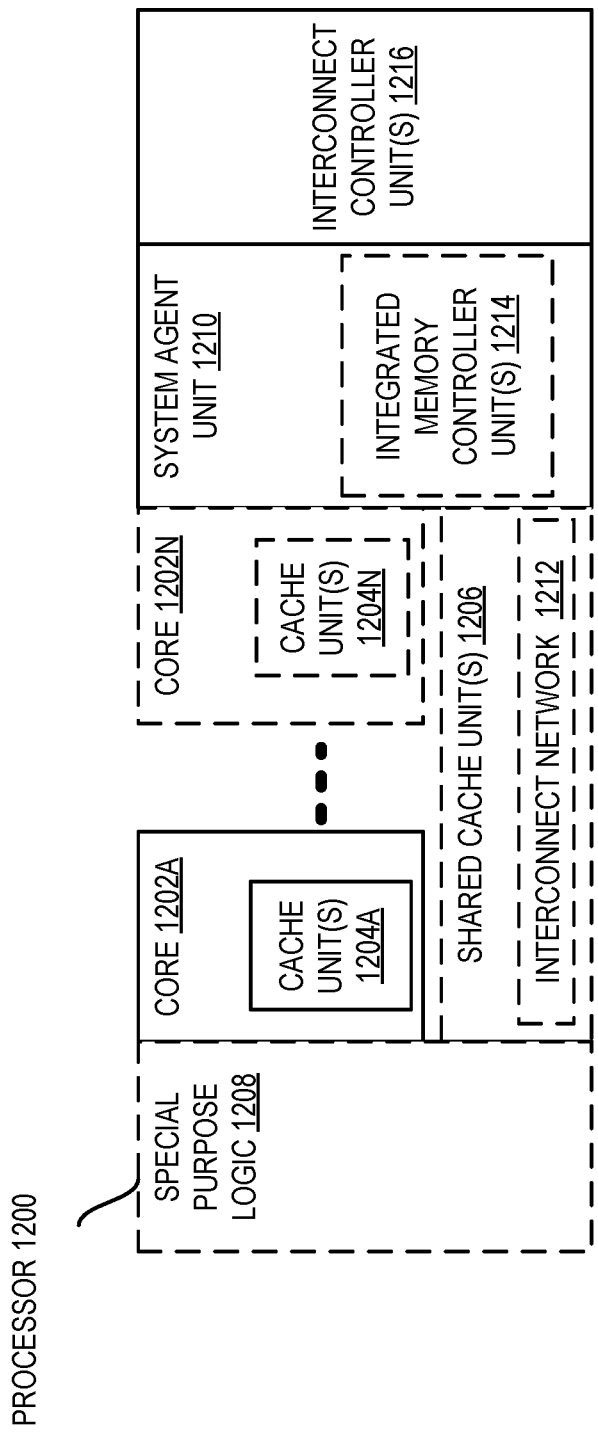
FIG. 12 illustrates a block diagram of embodiments of a processor that may have more than one core, may have an integrated memory controller, and may have integrated graphics.

FIG. 12 illustrates a block diagram of embodiments of a processor 1200 that may have more than one core, may have an integrated memory controller, and may have integrated graphics. The solid lined boxes illustrate a processor 1200 with a single core 1202A, a system agent 1210, a set of one or more interconnect controller units circuitry 1216, while the optional addition of the dashed lined boxes illustrates an alternative processor 1200 with multiple cores 1202(A)-(N), a set of one or more integrated memory controller unit(s) circuitry 1214 in the system agent unit circuitry 1210, and special purpose logic 1208, as well as a set of one or more interconnect controller units circuitry 1216. Note that the processor 1200 may be one of the processors 1170 or 1180, or co-processor 1138 or 1115 of FIG. 11.

Thus, different implementations of the processor 1200 may include: 1) a CPU with the special purpose logic 1208 being integrated graphics and/or scientific (throughput) logic (which may include one or more cores, not shown), and the cores 1202(A)-(N) being one or more general purpose cores (e.g., general purpose in-order cores, general purpose out-of-order cores, or a combination of the two); 2) a coprocessor with the cores 1202(A)-(N) being a large number of special purpose cores intended primarily for graphics and/or scientific (throughput); and 3) a coprocessor with the cores 1202(A)-(N) being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

A memory hierarchy includes one or more levels of cache unit(s) circuitry 1204(A)-(N) within the cores 1202(A)-(N), a set of one or more shared cache units circuitry 1206, and external memory (not shown) coupled to the set of integrated memory controller units circuitry 1214. The set of one or more shared cache units circuitry 1206 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 1212 interconnects the special purpose logic 1208 (e.g., integrated graphics logic), the set of shared cache units circuitry 1206, and the system agent unit circuitry 1210, alternative embodiments use any number of well-known techniques for interconnecting such units. In some embodiments, coherency is maintained between one or more of the shared cache units circuitry 1206 and cores 1202(A)-(N).

In some embodiments, one or more of the cores 1202(A)-(N) are capable of multi-threading. The system agent unit circuitry 1210 includes those components coordinating and operating cores 1202(A)-(N). The system agent unit circuitry 1210 may include, for example, power control unit (PCU) circuitry and/or display unit circuitry (not shown). The PCU may be or may include logic and components needed for regulating the power state of the cores 1202(A)-(N) and/or the special purpose logic 1208 (e.g., integrated graphics logic). The display unit circuitry is for driving one or more externally connected displays.

The cores 1202(A)-(N) may be homogenous or heterogeneous in terms of architecture instruction set; that is, two or more of the cores 1202(A)-(N) may be capable of executing the same instruction set, while other cores may be capable of executing only a subset of that instruction set or a different instruction set.

Exemplary Core Architectures
In-Order and Out-of-Order Core Block Diagram

Figure 13:
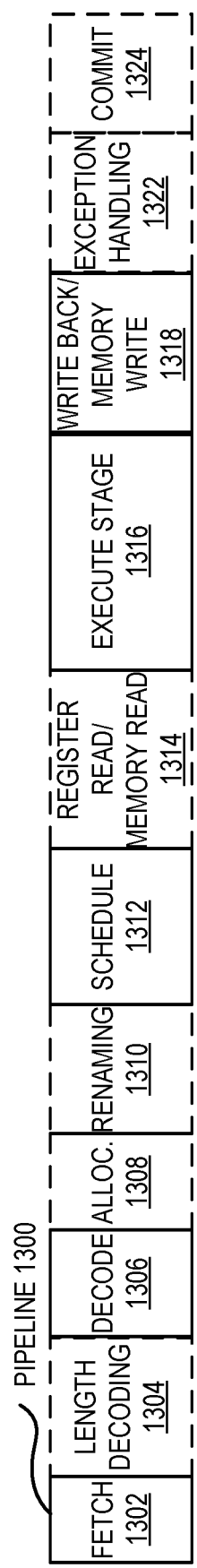
FIG. 13 is a block diagram illustrating both an exemplary in-order pipeline and an exemplary register renaming, out-of-order issue/execution pipeline according to some embodiments.

FIG. 13 is a block diagram illustrating both an exemplary in-order pipeline and an exemplary register renaming, out-of-order issue/execution pipeline according to some embodiments. FIG. 14 is a block diagram illustrating both an exemplary embodiment of an in-order architecture core and an exemplary register renaming, out-of-order issue/execution architecture core to be included in a processor according to some embodiments. The solid lined boxes in FIGS. 13-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13, a processor pipeline 1300 includes a fetch stage 1302, an optional length decode stage 1304, a decode stage 1306, an optional allocation stage 1308, an optional renaming stage 1310, a scheduling (also known as a dispatch or issue) stage 1312, an optional register read/memory read stage 1314, an execute stage 1316, a write back/memory write stage 1318, an optional exception handling stage 1322, and an optional commit stage 1324. One or more operations can be performed in each of these processor pipeline stages. For example, during the fetch stage 1302, one or more instructions are fetched from instruction memory, during the decode stage 1306, the one or more fetched instructions may be decoded, addresses (e.g., load store unit (LSU) addresses) using forwarded register ports may be generated, and branch forwarding (e.g., immediate offset or a link register (LR)) may be performed. In one embodiment, the decode stage 1306 and the register read/memory read stage 1314 may be combined into one pipeline stage. In one embodiment, during the execute stage 1316, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline as follows in relation to FIGS. 13 and 14: 1) the instruction fetch 1438 performs the fetch and length decoding stages 1302 and 1304; 2) the decode unit circuitry 1440 performs the decode stage 1306; 3) the rename/allocator unit circuitry 1452 performs the allocation stage 1308 and renaming stage 1310; 4) the scheduler unit(s) circuitry 1456 performs the schedule stage 1312; 5) the physical register file(s) unit(s) circuitry 1458 and the memory unit circuitry 1470 perform the register read/ memory read stage 1314; the execution cluster 1460 perform the execute stage 1316; 6) the memory unit circuitry 1470 and the physical register file(s) unit(s) circuitry 1458 perform the write back/memory write stage 1318; 7) various units (unit circuitry) may be involved in the exception handling stage 1322; and 8) the retirement unit circuitry 1454 and the physical register file(s) unit(s) circuitry 1458 perform the commit stage 1324.

FIG. 14 shows processor core 1490 including front-end unit circuitry 1430 coupled to an execution engine unit circuitry 1450, and both are coupled to a memory unit circuitry 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit circuitry 1430 may include branch prediction unit circuitry 1432 coupled to an instruction cache unit circuitry 1434, which is coupled to an instruction translation lookaside buffer (TLB) 1436, which is coupled to instruction fetch unit circuitry 1438, which is coupled to decode unit circuitry 1440. In one embodiment, the instruction cache unit circuitry 1434 is included in the memory unit circuitry 1470 rather than the front-end unit circuitry 1430. The decode unit circuitry 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1440 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM (not shown) or other medium that stores microcode for certain macroinstructions (e.g., in decode unit circuitry 1440 or otherwise within the front end unit circuitry 1430). In one embodiment, the decode unit circuitry 1440 includes a micro-operation (micro-op) or operation cache (not shown) to hold/cache decoded operations, micro-tags, or micro-operations generated during the decode or other stages of the processor pipeline 1300. The decode unit circuitry 1440 may be coupled to rename/allocator unit circuitry 1452 in the execution engine unit circuitry 1450.

The execution engine circuitry 1450 includes the rename/allocator unit circuitry 1452 coupled to a retirement unit circuitry 1454 and a set of one or more scheduler(s) circuitry 1456. The scheduler(s) circuitry 1456 represents any number of different schedulers, including reservations stations, central instruction window, etc. In some embodiments, the scheduler(s) circuitry 1456 can include arithmetic logic unit (ALU) scheduler/scheduling circuitry, ALU queues, arithmetic generation unit (AGU) scheduler/scheduling circuitry, AGU queues, etc. The scheduler(s) circuitry 1456 is coupled to the physical register file(s) circuitry 1458. Each of the physical register file(s) circuitry 1458 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 1458 includes vector registers unit circuitry, writemask registers unit circuitry, and scalar register unit circuitry. These register units may provide architectural vector registers, vector mask registers, general-purpose registers, etc. The physical register file(s) unit(s) circuitry 1458 is overlapped by the retirement unit circuitry 1454 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1454 and the physical register file(s) circuitry 1458 are coupled to the execution cluster(s) 1460. The execution cluster(s) 1460 includes a set of one or more execution units circuitry 1462 and a set of one or more memory access circuitry 1464. The execution units circuitry 1462 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1456, physical register file(s) unit(s) circuitry 1458, and execution cluster(s) 1460 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 1464). It should also be understood that where separate pipelines are used, one or more of these pipelines may be out-of-order issue/execution and the rest in-order.

In some embodiments, the execution engine unit circuitry 1450 may perform load store unit (LSU) address/data pipelining to an Advanced Microcontroller Bus (AHB) interface (not shown), and address phase and writeback, data phase load, store, and branches.

The set of memory access circuitry 1464 is coupled to the memory unit circuitry 1470, which includes data TLB unit circuitry 1472 coupled to a data cache circuitry 1474 coupled to a level 2 (L2) cache circuitry 1476. In one exemplary embodiment, the memory access units circuitry 1464 may include a load unit circuitry, a store address unit circuit, and a store data unit circuitry, each of which is coupled to the data TLB circuitry 1472 in the memory unit circuitry 1470. The instruction cache circuitry 1434 is further coupled to a level 2 (L2) cache unit circuitry 1476 in the memory unit circuitry 1470. In one embodiment, the instruction cache 1434 and the data cache 1474 are combined into a single instruction and data cache (not shown) in L2 cache unit circuitry 1476, a level 3 (L3) cache unit circuitry (not shown), and/or main memory. The L2 cache unit circuitry 1476 is coupled to one or more other levels of cache and eventually to a main memory.

The core 14C90 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 1490 includes logic to support a packed data instruction set extension (e.g., AVX1, AVX2), thereby allowing the operations used by many multimedia applications to be performed using packed data.

Exemplary Execution Unit(s) Circuitry

Figure 15:
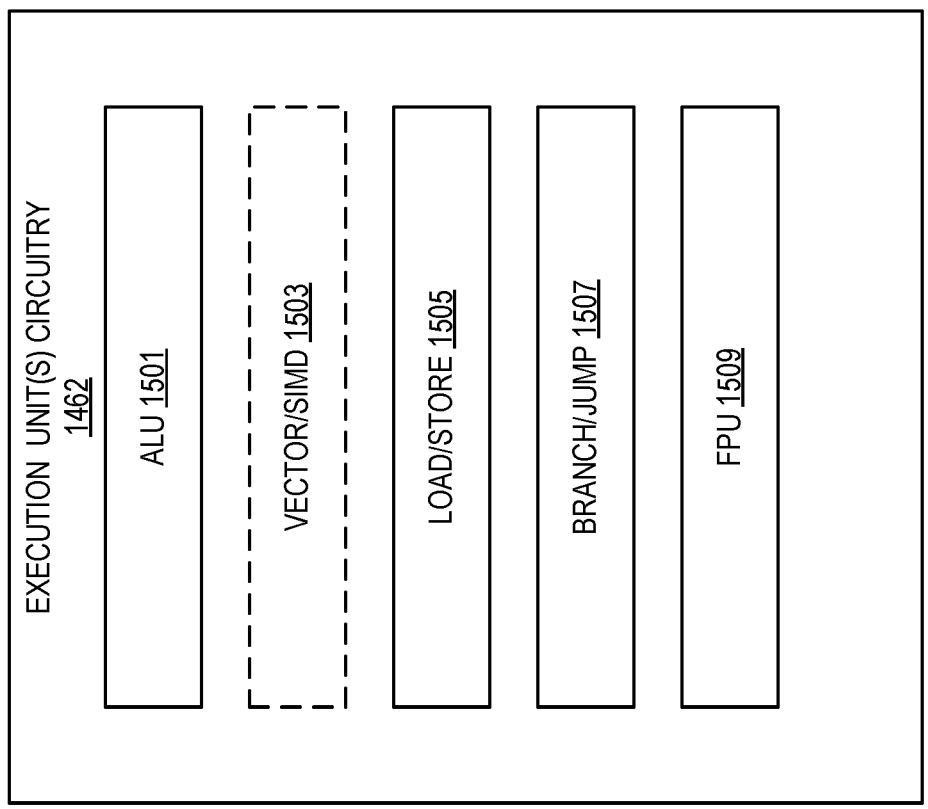
FIG. 15 illustrates embodiments of execution unit(s) circuitry, such as execution unit(s) circuitry shown in FIG. 14.

FIG. 15 illustrates embodiments of execution unit(s) circuitry, such as execution unit(s) circuitry 1462 of FIG. 14. As illustrated, execution unit(s) circuitry 1462 may include one or more ALU circuits 1501, vector/SIMD unit circuits 1503, load/store unit circuits 1505, and/or branch/jump unit circuits 1507. ALU circuits 1501 perform integer arithmetic and/or Boolean operations. Vector/SIMD unit circuits 1503 perform vector/SIMD operations on packed data (such as SIMD/vector registers). Load/store unit circuits 1505 execute load and store instructions to load data from memory into registers or store from registers to memory. Load/store unit circuits 1505 may also generate addresses. Branch/jump unit circuits 1507 cause a branch or jump to a memory address depending on the instruction. Floating-point unit (FPU) circuits 1509 perform floating-point arithmetic. The width of the execution unit(s) circuitry 1462 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 16:
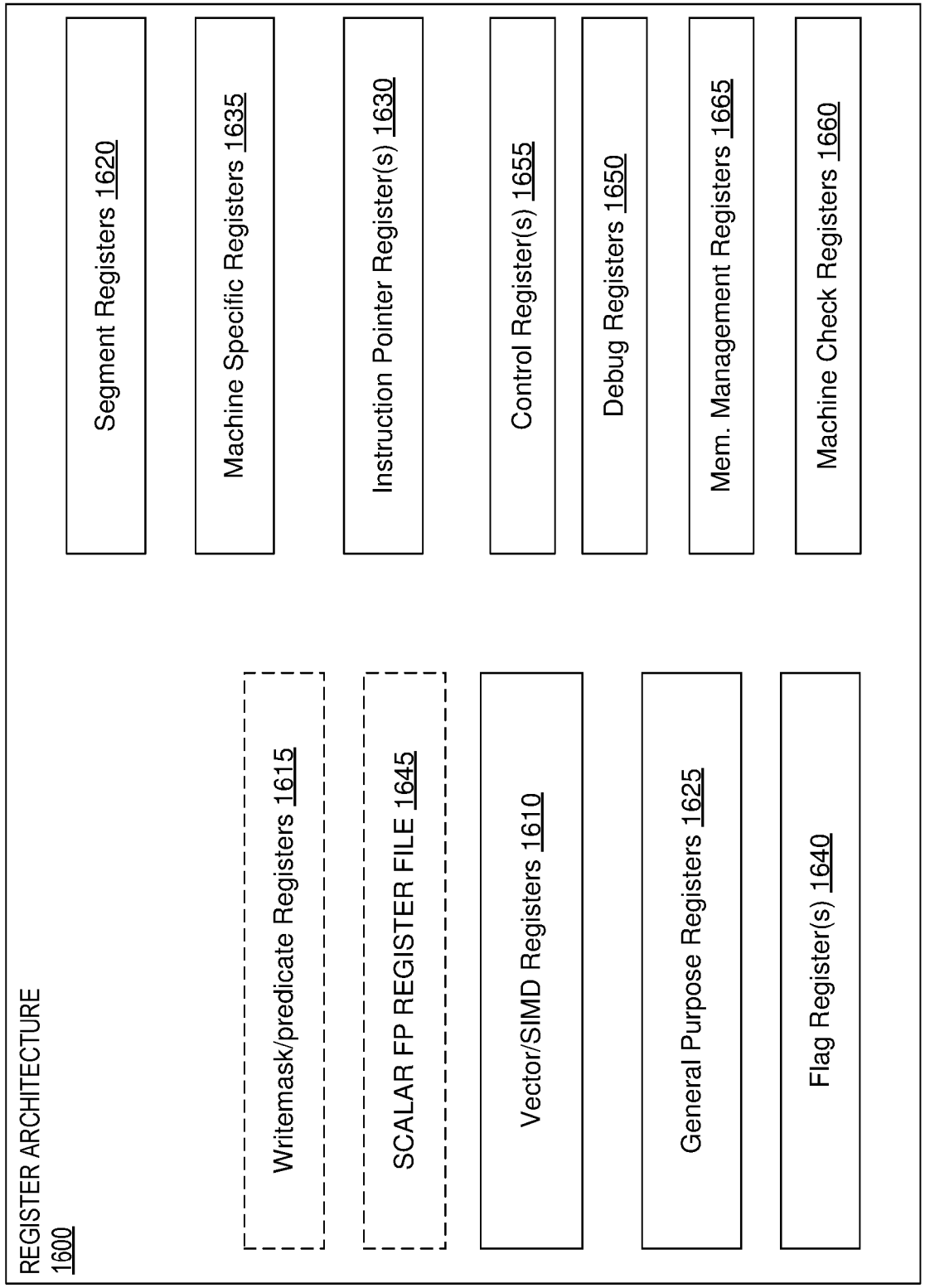
FIG. 16 is a block diagram of a register architecture 1600 according to some embodiments.

FIG. 16 is a block diagram of a register architecture 1600 according to some embodiments. As illustrated, there are vector/SIMD registers 1610 that vary from 128-bit to 1,024 bits width. In some embodiments, the vector/SIMD registers 1610 are physically 512-bits and, depending upon the mapping, only some of the lower bits are used. For example, in some embodiments, the vector/SIMD registers 1610 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1600 includes writemask/predicate registers 1615. For example, in some embodiments, there are 8 writemask/predicate registers (sometimes called k0 through k7) that are each 16-bit, 32-bit, 64-bit, or 128-bit in size. Writemask/predicate registers 1615 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1615 corresponds to a data element position of the destination. In other embodiments, the writemask/predicate registers 1615 are scalable and consists of a set number of enable bits for a given vector element (e.g., 8 enable bits per 64-bit vector element).

The register architecture 1600 includes a plurality of general-purpose registers 1625. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1600 includes scalar floating-point register 1645 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1640 (e.g., EFLAGS, RFLAGS, etc.) store status and control information for arithmetic, compare, and system operations. For example, the one or more flag registers 1640 may store condition code information such as carry, parity, auxiliary carry, zero, sign, and overflow. In some embodiments, the one or more flag registers 1640 are called program status and control registers.

Segment registers 1620 contain segment points for use in accessing memory. In some embodiments, these registers are referenced by the names CS, DS, SS, ES, FS, and GS.

Machine specific registers (MSRs) 1635 control and report on processor performance. Most MSRs 1635 handle system-related functions and are not accessible to an application program. Machine check registers 1660 consist of control, status, and error reporting MSRs that are used to detect and report on hardware errors.

One or more instruction pointer register(s) 1630 store an instruction pointer value. Control register(s) 1655 (e.g., CR0-CR4) determine the operating mode of a processor (e.g., processor 1170, 1180, 1138, 1115, and/or 1200) and the characteristics of a currently executing task. Debug registers 1650 control and allow for the monitoring of a processor or core's debugging operations.

Memory management registers 1665 specify the locations of data structures used in protected mode memory management. These registers may include a GDTR, IDRT, task register, and a LDTR register.

Alternative embodiments may use wider or narrower registers. Additionally, some embodiments may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 17:
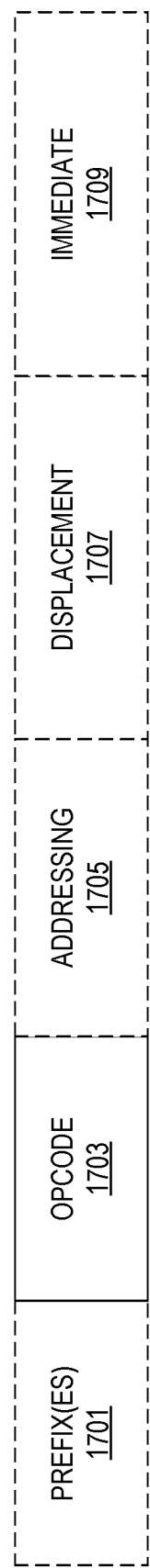
FIG. 17 illustrates embodiments of an instruction format.

FIG. 17 illustrates embodiments of an instruction format. As illustrated, an instruction may include multiple components including, but not limited to, one or more fields for: one or more prefixes 1701, an opcode 1703, addressing information 1705 (e.g., register identifiers, memory addressing information, etc.), a displacement value 1707, and/or an immediate 1709. Note that some instructions utilize some or all of the fields of the format whereas others may only use the field for the opcode 1703. In some embodiments, the order illustrated is the order in which these fields are to be encoded, however, it should be appreciated that in other embodiments these fields may be encoded in a different order, combined, etc.

The prefix(es) field(s) 1701, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1703 is used to at least partially define the operation to be performed upon a decoding of the instruction. In some embodiments, a primary opcode encoded in the opcode field 1703 is 1, 2, or 3 bytes in length. In other embodiments, a primary opcode can be a different length. An additional 3-bit opcode field is sometimes encoded in another field.

Figure 18:
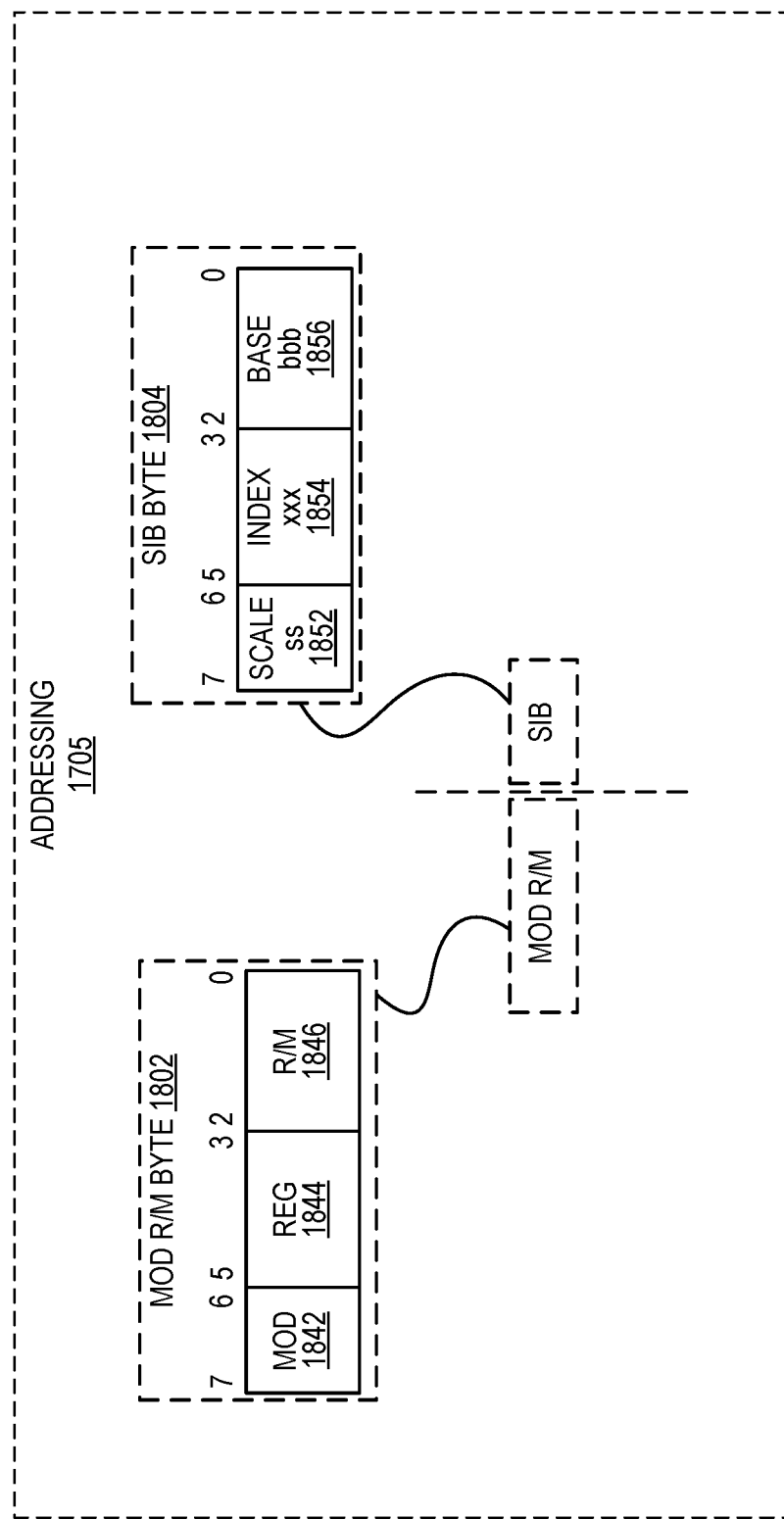
FIG. 18 illustrates embodiments of the addressing field.

The addressing field 1705 is used to address one or more operands of the instruction, such as a location in memory or one or more registers. FIG. 18 illustrates embodiments of the addressing field 1705. In this illustration, an optional ModR/M byte 1802 and an optional Scale, Index, Base (SIB) byte 1804 are shown. The ModR/M byte 1802 and the SIB byte 1804 are used to encode up to two operands of an instruction, each of which is a direct register or effective memory address. Note that each of these fields are optional in that not all instructions include one or more of these fields. The MOD R/M byte 1802 includes a MOD field 1842, a register field 1844, and R/M field 1846.

The content of the MOD field 1842 distinguishes between memory access and non-memory access modes. In some embodiments, when the MOD field 1842 has a value of b11, a register-direct addressing mode is utilized, and otherwise register-indirect addressing is used.

The register field 1844 may encode either the destination register operand or a source register operand, or may encode an opcode extension and not be used to encode any instruction operand. The content of register index field 1844, directly or through address generation, specifies the locations of a source or destination operand (either in a register or in memory). In some embodiments, the register field 1844 is supplemented with an additional bit from a prefix (e.g., prefix 1701) to allow for greater addressing.

The R/M field 1846 may be used to encode an instruction operand that references a memory address, or may be used to encode either the destination register operand or a source register operand. Note the R/M field 1846 may be combined with the MOD field 1842 to dictate an addressing mode in some embodiments.

The SIB byte 1804 includes a scale field 1852, an index field 1854, and a base field 1856 to be used in the generation of an address. The scale field 1852 indicates scaling factor. The index field 1854 specifies an index register to use. In some embodiments, the index field 1854 is supplemented with an additional bit from a prefix (e.g., prefix 1701) to allow for greater addressing. The base field 1856 specifies a base register to use. In some embodiments, the base field 1856 is supplemented with an additional bit from a prefix (e.g., prefix 1701) to allow for greater addressing. In practice, the content of the scale field 1852 allows for the scaling of the content of the index field 1854 for memory address generation (e.g., for address generation that uses $2^{scale}*\text{index}+\text{base}$).

Some addressing forms utilize a displacement value to generate a memory address. For example, a memory address may be generated according to $2^{scale}*\text{index}+\text{base}+\text{displacement}$, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1707 provides this value. Additionally, in some embodiments, a displacement factor usage is encoded in the MOD field of the addressing field 1705 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1707.

In some embodiments, an immediate field 1709 specifies an immediate for the instruction. An immediate may be encoded as a 1-byte value, a 2-byte value, a 4-byte value, etc.

Figure 19:
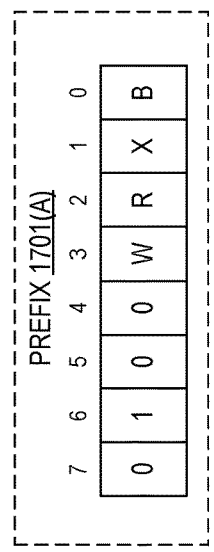
FIG. 19 illustrates embodiments of a first prefix.

FIG. 19 illustrates embodiments of a first prefix 1701(A). In some embodiments, the first prefix 1701(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1701(A) may specify up to three registers using 3-bit fields depending on the format: 1) using the reg field 1844 and the R/M field 1846 of the Mod R/M byte 1802; 2) using the Mod R/M byte 1802 with the SIB byte 1804 including using the reg field 1844 and the base field 1856 and index field 1854; or 3) using the register field of an opcode.

In the first prefix 1701(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1844 and MOD R/M R/M field 1846 alone can each only address 8 registers.

In the first prefix 1701(A), bit position 2 (R) may an extension of the MOD R/M reg field 1844 and may be used to modify the ModR/M reg field 1844 when that field encodes a general purpose register, a 64-bit packed data register (e.g., an SSE register), or a control or debug register. R is ignored when Mod R/M byte 1802 specifies other registers or defines an extended opcode.

Bit position 1 (X) X bit may modify the SIB byte index field 1854.

Bit position B (B) B may modify the base in the Mod R/M R/M field 1846 or the SIB byte base field 1856; or it may modify the opcode register field used for accessing general purpose registers (e.g., general purpose registers 1625).

Figure 20B:
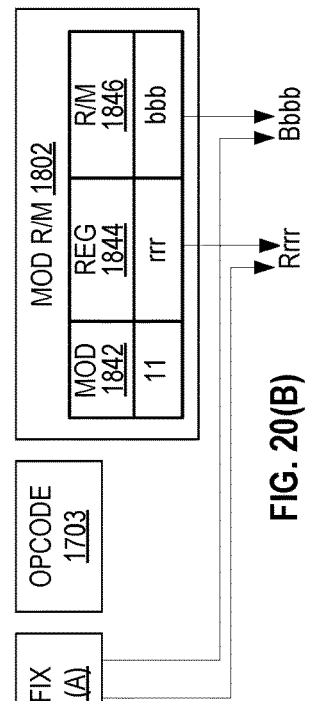
FIGS. 20(A)-(D) illustrate embodiments of how the R, X, and B fields of the first prefix are used.
Figure 20D:
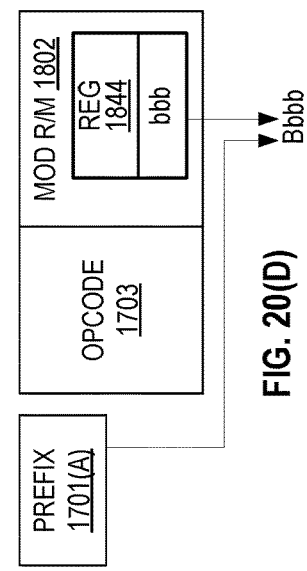
Figure 20A:
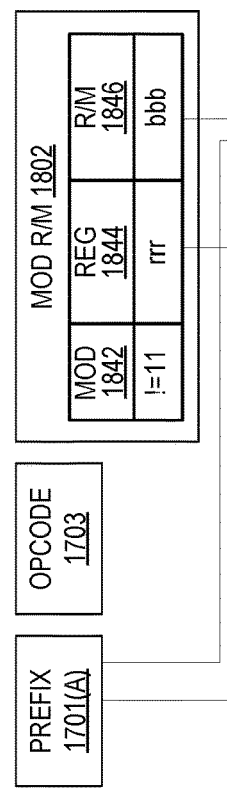
Figure 20C:
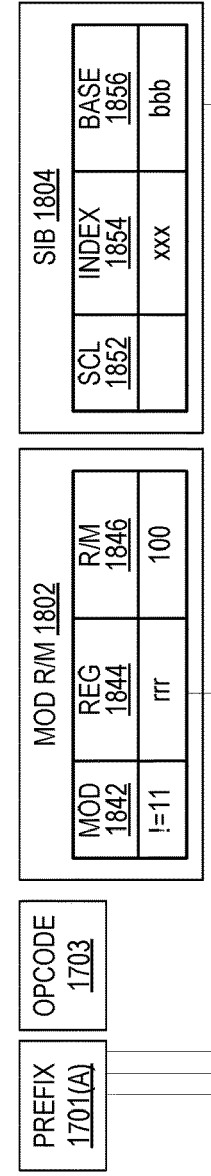

FIGS. 20(A)-(D) illustrate embodiments of how the R, X, and B fields of the first prefix 1701(A) are used. FIG. 20(A) illustrates R and B from the first prefix 1701(A) being used to extend the reg field 1844 and R/M field 1846 of the MOD R/M byte 1802 when the SIB byte 1804 is not used for memory addressing. FIG. 20(B) illustrates R and B from the first prefix 1701(A) being used to extend the reg field 1844 and R/M field 1846 of the MOD R/M byte 1802 when the SIB byte 1804 is not used (register-register addressing). FIG. 20(C) illustrates R, X, and B from the first prefix 1701(A) being used to extend the reg field 1844 of the MOD R/M byte 1802 and the index field 1854 and base field 1856 when the SIB byte 1804 being used for memory addressing. FIG. 20(D) illustrates B from the first prefix 1701(A) being used to extend the reg field 1844 of the MOD R/M byte 1802 when a register is encoded in the opcode 1703.

Figure 21A:
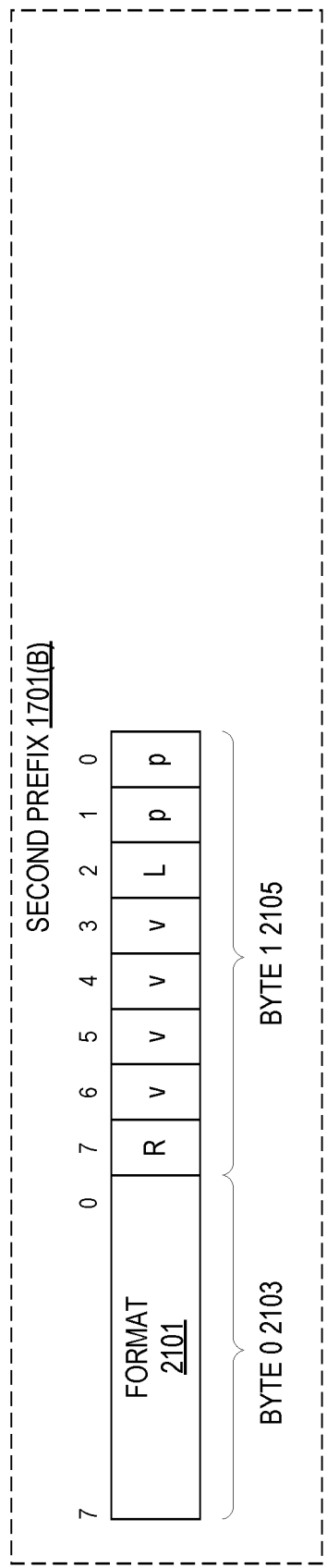
FIGS. 21(A)-(B) illustrate embodiments of a second prefix.
Figure 21B:
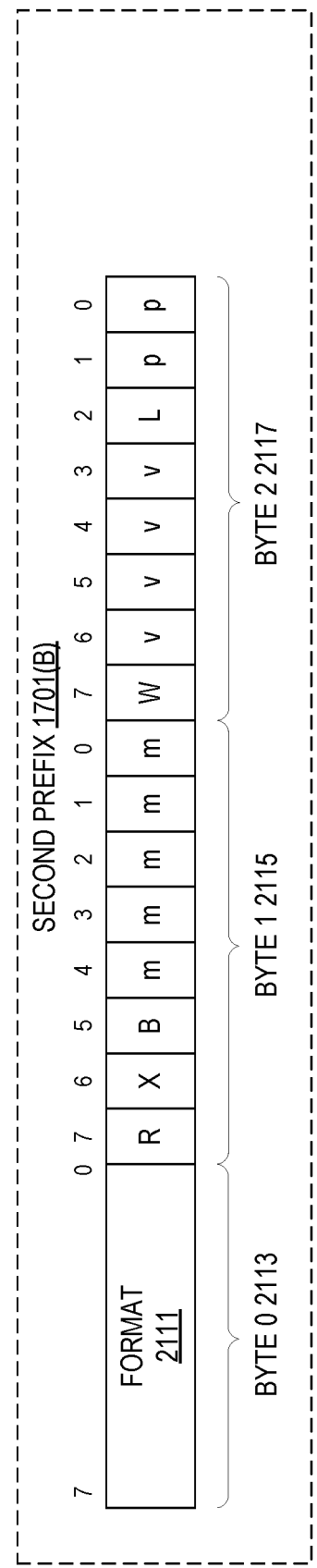

FIGS. 21(A)-(B) illustrate embodiments of a second prefix 1701(B). In some embodiments, the second prefix 1701(B) is an embodiment of a VEX prefix. The second prefix 1701(B) encoding allows instructions to have more than two operands, and allows SIMD vector registers (e.g., vector/SIMD registers 1610) to be longer than 64-bits (e.g., 128-bit and 256-bit). The use of the second prefix 1701(B) provides for three-operand (or more) syntax. For example, previous two-operand instructions performed operations such as A=A+B, which overwrites a source operand. The use of the second prefix 1701(B) enables operands to perform nondestructive operations such as A=B+C.

In some embodiments, the second prefix 1701(B) comes in two forms—a two-byte form and a three-byte form. The two-byte second prefix 1701(B) is used mainly for 128-bit, scalar, and some 256-bit instructions; while the three-byte second prefix 1701(B) provides a compact replacement of the first prefix 1701(A) and 3-byte opcode instructions.

FIG. 21(A) illustrates embodiments of a two-byte form of the second prefix 1701(B). In one example, a format field 2101 (byte 0 2103) contains the value C5H. In one example, byte 1 2105 includes a "R" value in bit[7]. This value is the complement of the same value of the first prefix 1701(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1846 to encode the instruction operand that references a memory address or encode either the destination register operand or a source register operand.

Instructions that use this prefix may use the Mod R/M reg field 1844 to encode either the destination register operand or a source register operand, be treated as an opcode extension and not used to encode any instruction operand.

For instruction syntax that support four operands, vvvv, the Mod R/M R/M field 1846 and the Mod R/M reg field 1844 encode three of the four operands. Bits[7:4] of the immediate 1709 are then used to encode the third source register operand.

FIG. 21(B) illustrates embodiments of a three-byte form of the second prefix 1701(B). in one example, a format field 2111 (byte 0 2113) contains the value C4H. Byte 1 2115 includes in bits[7:5]"R," "X," and "B" which are the complements of the same values of the first prefix 1701(A). Bits[4:0] of byte 1 2115 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 2117 is used similar to W of the first prefix 1701(A) including helping to determine promotable operand sizes. Bit[2] is used to dictate the length (L) of the vector (where a value of 0 is a scalar or 128-bit vector and a value of 1 is a 256-bit vector). Bits[1:0]provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 1846 to encode the instruction operand that references a memory address or encode either the destination register operand or a source register operand.

Instructions that use this prefix may use the Mod R/M reg field 1844 to encode either the destination register operand or a source register operand, be treated as an opcode extension and not used to encode any instruction operand.

For instruction syntax that support four operands, vvvv, the Mod R/M R/M field 1846, and the Mod R/M reg field 1844 encode three of the four operands. Bits[7:4] of the immediate 1709 are then used to encode the third source register operand.

Figure 22:
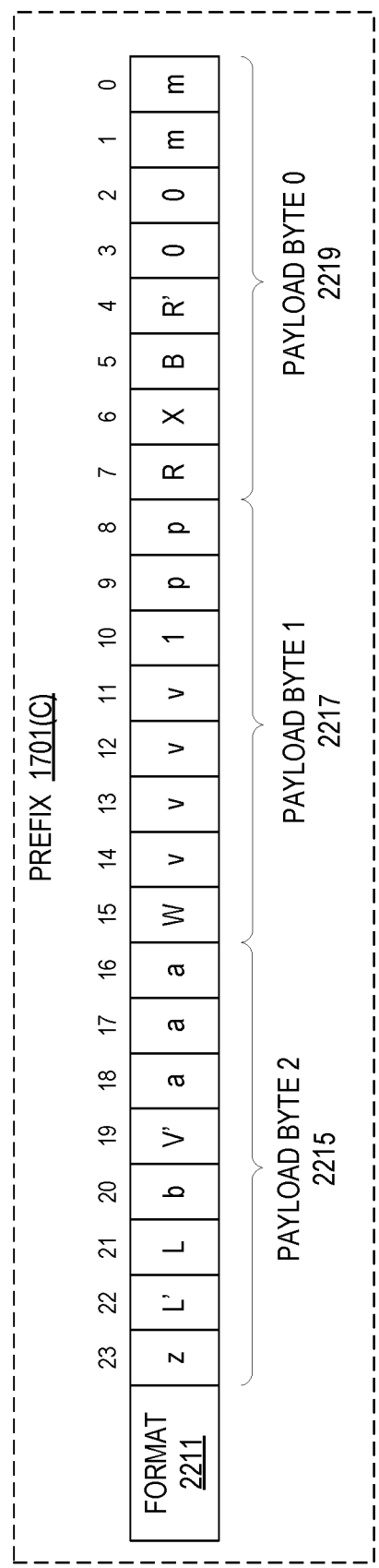
FIG. 22 illustrates embodiments of a third prefix.

FIG. 22 illustrates embodiments of a third prefix 1701(C). In some embodiments, the first prefix 1701(A) is an embodiment of an EVEX prefix. The third prefix 1701(C) is a four-byte prefix.

The third prefix 1701(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 16) or predication utilize this prefix. Opmask register allow for conditional processing or selection control. Opmask instructions, whose source/destination operands are opmask registers and treat the content of an opmask register as a single value, are encoded using the second prefix 1701(B).

The third prefix 1701(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1701(C) is a format field 2211 that has a value, in one example, of 62H. Subsequent bytes are referred to as payload bytes 2215-2219 and collectively form a 24-bit value of P[23:0] providing specific capability in the form of one or more fields (detailed herein).

In some embodiments, P[1:0] of payload byte 2219 are identical to the low two mmmmm bits. P[3:2] are reserved in some embodiments. Bit P[4] (R') allows access to the high 16 vector register set when combined with P[7] and the ModR/M reg field 1844. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1844 and ModR/M R/M field 1846. P[9:8] provide opcode extensibility equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1701(A) and second prefix 1711(B) and may serve as an opcode extension bit or operand size promotion.

P[18:16] specify the index of a register in the opmask (writemask) registers (e.g., writemask/predicate registers 1615). In one embodiment, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While some embodiments are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 1701(C) are detailed in the following tables.

TABLE 1

32-Register Support in 64-bit Mode

|  | 4 | 3 | [2:0] | REG. TYPE | COMMON USAGES |
|---|---|---|---|---|---|
| REG | R' | R | ModR/M reg | GPR, Vector | Destination or Source |
| VVVV | V' |  | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

|  | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

|  | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | k0$^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, some embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
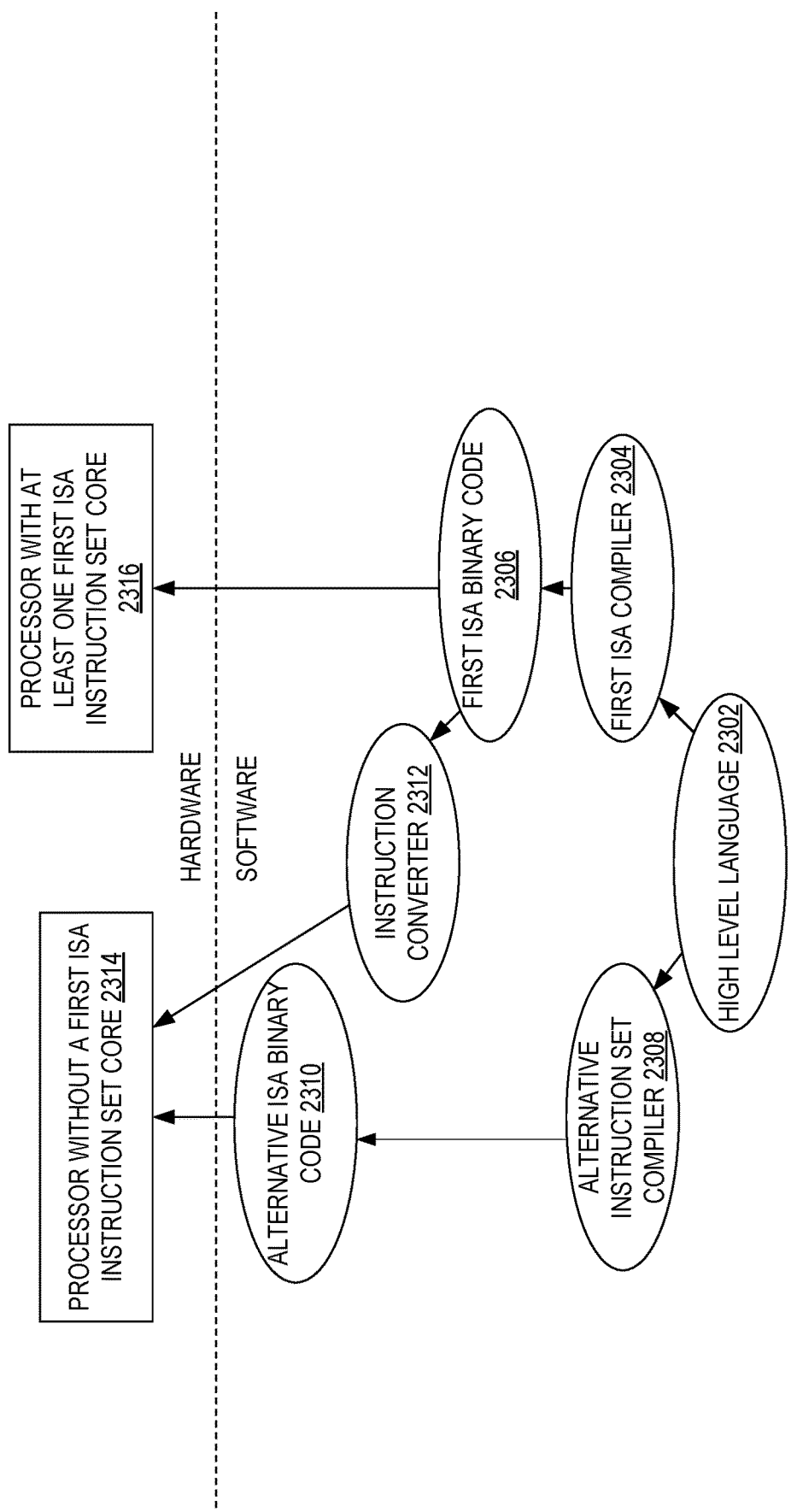
FIG. 23 illustrates a block diagram contrasting the use of a software instruction converter to convert binary instructions in a source instruction set to binary instructions in a target instruction set according to some embodiments.

FIG. 23 illustrates a block diagram contrasting the use of a software instruction converter to convert binary instructions in a source instruction set to binary instructions in a target instruction set according to some embodiments. In the illustrated embodiment, the instruction converter is a software instruction converter, although alternatively the instruction converter may be implemented in software, firmware, hardware, or various combinations thereof. FIG. 23 shows a program in a high level language 2302 may be compiled using a first ISA compiler 2304 to generate first ISA binary code 2306 that may be natively executed by a processor with at least one first instruction set core 2316. The processor with at least one first ISA instruction set core 2316 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 2304 represents a compiler that is operable to generate first ISA binary code 2306 (e.g., object code) that can, with or without additional linkage processing, be executed on the processor with at least one first ISA instruction set core 2316. Similarly, FIG. 23 shows the program in the high level language 2302 may be compiled using an alternative instruction set compiler 2308 to generate alternative instruction set binary code 2310 that may be natively executed by a processor without a first ISA instruction set core 2314. The instruction converter 2312 is used to convert the first ISA binary code 2306 into code that may be natively executed by the processor without a first ISA instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation, or any other process, allows a processor or other electronic device that does not have a first ISA instruction set processor or core to execute the first ISA binary code 2306.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Exemplary embodiments include, but are not limited to:
1. A processor for processing an indirect memory access instruction, in which the instruction accesses a memory location via at least one indirect address, the processor comprising:
a pipeline to process the instruction;
a multiple memory operation engine to generate a first access to the at least one indirect address and a second access to a target address determined by the at least one indirect address; and a cache memory communicatively coupled to the pipeline and the multiple memory operation engine to cache a plurality of pointers, wherein:
in response to a cache hit when executing the indirect memory access instruction, dereference a pointer to obtain the at least one indirect address, not set a cache bit, and return data for the instruction without storing the data in the cache memory; and in response to a cache miss when executing the indirect memory access instruction, set the cache bit, obtain a cache line for a missed pointer for the instruction, store the cache line for the missed pointer in the cache memory, and return data for the instruction without storing the data in the cache memory;

wherein the multiple memory operation engine bases a memory access operation of the instruction by a state of the cache bit and pointers related to the instruction to compute a next address determined by the at least one indirect address, and return the data.

2. The processor of example 1, wherein the indirect memory access instruction is an instruction supporting Programmable Integrated Unified Memory Architecture.

3. The processor in any of examples 1-2, wherein the indirect memory access instruction is an indirect load instruction, indirect store instruction, or indirect store acknowledgment instruction.

4. The processor in any of examples 1-3, wherein the indirect memory access instruction is an instruction having more than one indirection.

5. The processor in any of examples 1-3, wherein the returned data is in response to an indirect load or indirect store acknowledgment instruction.

6. The processor in any of examples 1-5, further comprising a load/store queue communicatively coupled to the pipeline to interface operations between the pipeline and the cache memory.

7. The processor in any of examples 1-6, wherein the pipeline is a multi-threaded pipeline.

8. The processor in any of examples 1-7, wherein the multiple memory operation engine is a dual memory operation engine.

9. A method of processing an indirect memory access instruction, in which the instruction accesses a memory location via at least one indirect address, the method comprising:

processing the instruction utilizing a pipeline;

generating, by use of a multiple memory operation engine, a first access to the at least one indirect address and a second access to a target address determined by the at least one indirect address;

in response to a cache hit when executing the indirect memory access instruction, dereferencing a pointer to obtain the at least one indirect address, not setting a cache bit, and returning data for the instruction without storing the data in a cache memory; and in response to a cache miss when executing the indirect memory access instruction, setting the cache bit, obtaining a cache line for a missed pointer for the instruction, storing the cache line for the missed pointer in the cache memory, and returning data for the instruction without storing the data in the cache memory;

wherein the multiple memory operation engine bases a memory access operation of the instruction by a state of the cache bit and pointers related to the instruction to compute a next address determined by the at least one indirect address, and return the data.

10. The method of example 9, wherein the indirect memory access instruction is an instruction supporting Programmable Integrated Unified Memory Architecture.

11. The method in any of examples 9-10, wherein the indirect memory access instruction is an indirect load instruction, indirect store instruction, or indirect store acknowledgment instruction.

12. The method in any of examples 9-11, wherein the indirect memory access instruction is an instruction having more than one indirection.

13. The method in any of examples 9-11, wherein the returned data is in response to an indirect load or indirect store acknowledgment instruction.

14. The method in any of examples 9-13, further comprising a load/store queue to interface operations between the pipeline and the cache memory.

15. The method in any of examples 9-14, wherein the multiple memory operation engine sends an 8 byte load request to the memory when the cache bit is not set and sends a 64 byte load request to the memory when the cache bit is set.

16. A system for processing an indirect memory access instruction supporting Programmable Integrated Unified Memory Architecture, in which the instruction accesses a memory location via at least one indirect address, the system comprising:

a plurality of pipelines, in which a pipeline of the plurality of pipelines to process the instruction;

a multiple memory operation engine associated with the pipeline to generate a first access to the at least one indirect address and a second access to a target address determined by the at least one indirect address; and a cache memory communicatively coupled to the pipeline and the multiple memory operation engine to cache a plurality of pointers, wherein:

in response to a cache hit when executing the indirect memory access instruction, dereference a pointer to obtain the at least one indirect address, not set a cache bit, and return data for the instruction without storing the data in the cache memory; and in response to a cache miss when executing the indirect memory access instruction, set the cache bit, obtain a cache line for a missed pointer for the instruction, store the cache line for the missed pointer in the cache memory, and return data for the instruction without storing the data in the cache memory;

wherein the multiple memory operation engine bases a memory access operation of the instruction by a state of the cache bit and pointers related to the instruction to compute a next address determined by the at least one indirect address, and return the data.

17. The system of example 16, wherein at least some of the plurality of pipelines are multi-threaded pipeline.

18. The system in any of examples 16-17, wherein the indirect memory access instruction is an indirect load instruction, indirect store instruction, or indirect store acknowledgment instruction.

19. The system in any of examples 16-18, wherein the indirect memory access instruction is an instruction having more than one indirection.

20. The system in any of examples 16-19, wherein the multiple memory operation engine is a dual memory operation engine.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A processor for processing an indirect memory access instruction, in which the instruction accesses a memory location via at least one indirect address, the processor comprising:

a pipeline to process the instruction;
a multiple memory operation engine to generate a first access to the at least one indirect address and a second access to a target address determined by the at least one indirect address; and
a cache memory communicatively coupled to the pipeline and the multiple memory operation engine to cache a plurality of pointers, wherein:
in response to a cache hit when executing the indirect memory access instruction, dereference a pointer to obtain the at least one indirect address, not set a cache bit, and return data for the instruction without storing the data in the cache memory; and
in response to a cache miss when executing the indirect memory access instruction, set the cache bit, obtain a cache line for a missed pointer for the instruction, store the cache line for the missed pointer in the cache memory, and return data for the instruction without storing the data in the cache memory;
wherein the multiple memory operation engine bases a memory access operation of the instruction by a state of the cache bit and pointers related to the instruction to compute a next address determined by the at least one indirect address, and return the data.

2. The processor of claim 1, wherein the indirect memory access instruction is an instruction supporting Programmable Integrated Unified Memory Architecture.

3. The processor of claim 1, wherein the indirect memory access instruction is an indirect load instruction, indirect store instruction, or indirect store acknowledgment instruction.

4. The processor of claim 1, wherein the indirect memory access instruction is an instruction having more than one indirection.

5. The processor of claim 1, wherein the returned data is in response to an indirect load or indirect store acknowledgment instruction.

6. The processor of claim 1, further comprising a load/store queue communicatively coupled to the pipeline to interface operations between the pipeline and the cache memory.

7. The processor of claim 1, wherein the pipeline is a multi-threaded pipeline.

8. The processor of claim 1, wherein the multiple memory operation engine is a dual memory operation engine.

9. A method of processing an indirect memory access instruction, in which the instruction accesses a memory location via at least one indirect address, the method comprising:
processing the instruction utilizing a pipeline;
generating, by use of a multiple memory operation engine, a first access to the at least one indirect address and a second access to a target address determined by the at least one indirect address;
in response to a cache hit when executing the indirect memory access instruction, dereferencing a pointer to obtain the at least one indirect address, not setting a cache bit, and returning data for the instruction without storing the data in a cache memory; and
in response to a cache miss when executing the indirect memory access instruction, setting the cache bit, obtaining a cache line for a missed pointer for the instruction, storing the cache line for the missed pointer in the cache memory, and returning data for the instruction without storing the data in the cache memory;
wherein the multiple memory operation engine bases a memory access operation of the instruction by a state of the cache bit and pointers related to the instruction to compute a next address determined by the at least one indirect address, and return the data.

10. The method of claim 9, wherein the indirect memory access instruction is an instruction supporting Programmable Integrated Unified Memory Architecture.

11. The method of claim 9, wherein the indirect memory access instruction is an indirect load instruction, indirect store instruction, or indirect store acknowledgment instruction.

12. The method of claim 9, wherein the indirect memory access instruction is an instruction having more than one indirection.

13. The method of claim 9, wherein the returned data is in response to an indirect load or indirect store acknowledgment instruction.

14. The method of claim 9, further comprising a load/store queue to interface operations between the pipeline and the cache memory.

15. The method of claim 9, wherein the multiple memory operation engine sends an 8 byte load request to the memory when the cache bit is not set and sends a 64 byte load request to the memory when the cache bit is set.

16. A system for processing an indirect memory access instruction supporting Programmable Integrated Unified Memory Architecture, in which the instruction accesses a memory location via at least one indirect address, the system comprising:
a plurality of pipelines, in which a pipeline of the plurality of pipelines to process the instruction;
a multiple memory operation engine associated with the pipeline to generate a first access to the at least one indirect address and a second access to a target address determined by the at least one indirect address; and
a cache memory communicatively coupled to the pipeline and the multiple memory operation engine to cache a plurality of pointers, wherein:
in response to a cache hit when executing the indirect memory access instruction, dereference a pointer to obtain the at least one indirect address, not set a cache bit, and return data for the instruction without storing the data in the cache memory; and
in response to a cache miss when executing the indirect memory access instruction, set the cache bit, obtain a cache line for a missed pointer for the instruction, store the cache line for the missed pointer in the cache memory, and return data for the instruction without storing the data in the cache memory;
wherein the multiple memory operation engine bases a memory access operation of the instruction by a state of the cache bit and pointers related to the instruction to compute a next address determined by the at least one indirect address, and return the data.

17. The system of claim 16, wherein at least some of the plurality of pipelines are multi-threaded pipeline.

18. The system of claim 16, wherein the indirect memory access instruction is an indirect load instruction, indirect store instruction, or indirect store acknowledgment instruction.

19. The system of claim 16, wherein the indirect memory access instruction is an instruction having more than one indirection.

20. The system of claim 16, wherein the multiple memory operation engine is a dual memory operation engine.

* * * * *